United States Patent [19]
Van Steenwyk et al.

[11] Patent Number: 5,883,516
[45] Date of Patent: Mar. 16, 1999

[54] APPARATUS AND METHOD FOR ELECTRIC FIELD TELEMETRY EMPLOYING COMPONENT UPPER AND LOWER HOUSINGS IN A WELL PIPESTRING

[75] Inventors: Donald H. Van Steenwyk, San Marino, Calif.; James N. Towle, Seattle, Wash.; Timothy Price, Templeton, Calif.

[73] Assignee: Scientific Drilling International, Houston, Tex.

[21] Appl. No.: 707,270

[22] Filed: Sep. 3, 1996

Related U.S. Application Data

[60] Provisional application No. 60/024,794 Jul. 31, 1996.

[51] Int. Cl.$^6$ .......................................................... G01V 3/02
[52] U.S. Cl. .......................... 324/366; 324/368; 324/369; 175/50
[58] Field of Search ..................................... 324/356, 369, 324/323, 366, 368; 175/50, 217; 340/854.6, 854.3, 854.4, 854.5; 73/152.03

[56] References Cited

U.S. PATENT DOCUMENTS

| | | | |
|---|---|---|---|
| 2,364,957 | 12/1944 | Douglas | 324/356 |
| 2,389,241 | 11/1945 | Silverman . | |
| 2,400,170 | 5/1946 | Silverman | 324/369 |
| 2,650,067 | 8/1953 | Martin | 175/50 |
| 2,681,567 | 6/1954 | Widess | 324/356 |
| 2,924,432 | 2/1960 | Arps et al. . | |
| 2,938,708 | 5/1960 | Arps | 324/356 |
| 2,941,784 | 6/1960 | Martin | 324/369 |
| 3,046,474 | 7/1962 | Arps . | |
| 3,302,457 | 2/1967 | Mayes . | |
| 3,309,656 | 3/1967 | Godbey . | |
| 3,517,553 | 6/1970 | Williams et al. . | |
| 3,711,825 | 1/1973 | Claycomb . | |
| 3,736,558 | 5/1973 | Cubberly, Jr. . | |
| 3,782,464 | 1/1974 | Quichaud et al. . | |
| 3,831,138 | 8/1974 | Rammner | 324/323 |
| 3,958,217 | 5/1976 | Spinnler . | |
| 4,015,234 | 3/1977 | Krebs . | |
| 4,057,781 | 11/1977 | Scherbatskoy . | |
| 4,072,200 | 2/1978 | Morris et al. . | |
| 4,078,620 | 3/1978 | Westlake et al. . | |
| 4,130,169 | 12/1978 | Denison . | |
| 4,160,970 | 7/1979 | Nicolson . | |
| 4,181,014 | 1/1980 | Zuvela et al. . | |
| 4,262,343 | 4/1981 | Claycomb . | |
| 4,351,037 | 9/1982 | Scherbatskoy . | |
| 4,468,762 | 8/1984 | Jurgens . | |
| 4,496,174 | 1/1985 | McDonald et al. . | |
| 4,578,675 | 3/1986 | MacLeod . | |
| 4,684,946 | 8/1987 | Issenmann . | |
| 4,691,203 | 9/1987 | Rubin et al. . | |

(List continued on next page.)

FOREIGN PATENT DOCUMENTS

| | | |
|---|---|---|
| 2235296 | 2/1991 | United Kingdom . |
| 2290385 | 12/1995 | United Kingdom . |

*Primary Examiner*—Jay M. Patidar
*Attorney, Agent, or Firm*—William W. Haefliger

[57] ABSTRACT

An apparatus for borehole electric field telemetry includes a source of modulated voltage or current, at least one axially extending collar connected between pipe sections in a pipe string, and a system of insulated wireline components providing electrical connections, insulated from drilling fluids, between the ends of the one or more aforementioned insulative collars in the pipe string, to transmit the voltage or current. The source of modulated voltage or current comprises an electrical pulse-producer for producing short duration pulse wave forms selected to obtain optimum transmission characteristics in the underground formation. The electrical connections are to the drillstring, and there are upper and lower instrument housings associated with the electrical connections, which are upper and lower connections. The housings are supported within the pipe string, the upper housing located above at least one of the insulative collars, and the lower housing projecting below the insulative collar. The pulse-producing means is located within at least one of such housings.

23 Claims, 19 Drawing Sheets

U.S. PATENT DOCUMENTS

| | | |
|---|---|---|
| 4,694,439 | 9/1987 | Moll . |
| 4,699,352 | 10/1987 | Mumby . |
| 4,715,022 | 12/1987 | Yeo . |
| 4,766,442 | 8/1988 | Issenmann . |
| 4,774,694 | 9/1988 | Moll . |
| 4,820,989 | 4/1989 | Vail, III . |
| 4,821,035 | 4/1989 | Hanson et al. . |
| 4,980,682 | 12/1990 | Klein et al. . |
| 5,043,668 | 8/1991 | Vail, III . |
| 5,061,849 | 10/1991 | Meisner et al. . |
| 5,081,419 | 1/1992 | Meador et al. . |
| 5,090,256 | 2/1992 | Issenmann . |
| 5,130,706 | 7/1992 | Van Steenwyk . |
| 5,138,313 | 8/1992 | Barrington . |
| 5,155,916 | 10/1992 | Engebretson . |
| 5,189,415 | 2/1993 | Shimada et al. . |
| 5,230,387 | 7/1993 | Waters et al. . |
| 5,235,285 | 8/1993 | Clark et al. . |
| 5,270,703 | 12/1993 | Guest . |
| 5,321,893 | 6/1994 | Engebretson . |
| 5,366,018 | 11/1994 | Van Steenwyk et al. . |
| 5,390,153 | 2/1995 | Scherbatskoy . |
| 5,396,232 | 3/1995 | Mathieu et al. . |
| 5,402,068 | 3/1995 | Meador et al. . |
| 5,467,083 | 11/1995 | McDonald et al. . |
| 5,467,832 | 11/1995 | Orban et al. . |
| 5,512,889 | 4/1996 | Fletcher . |

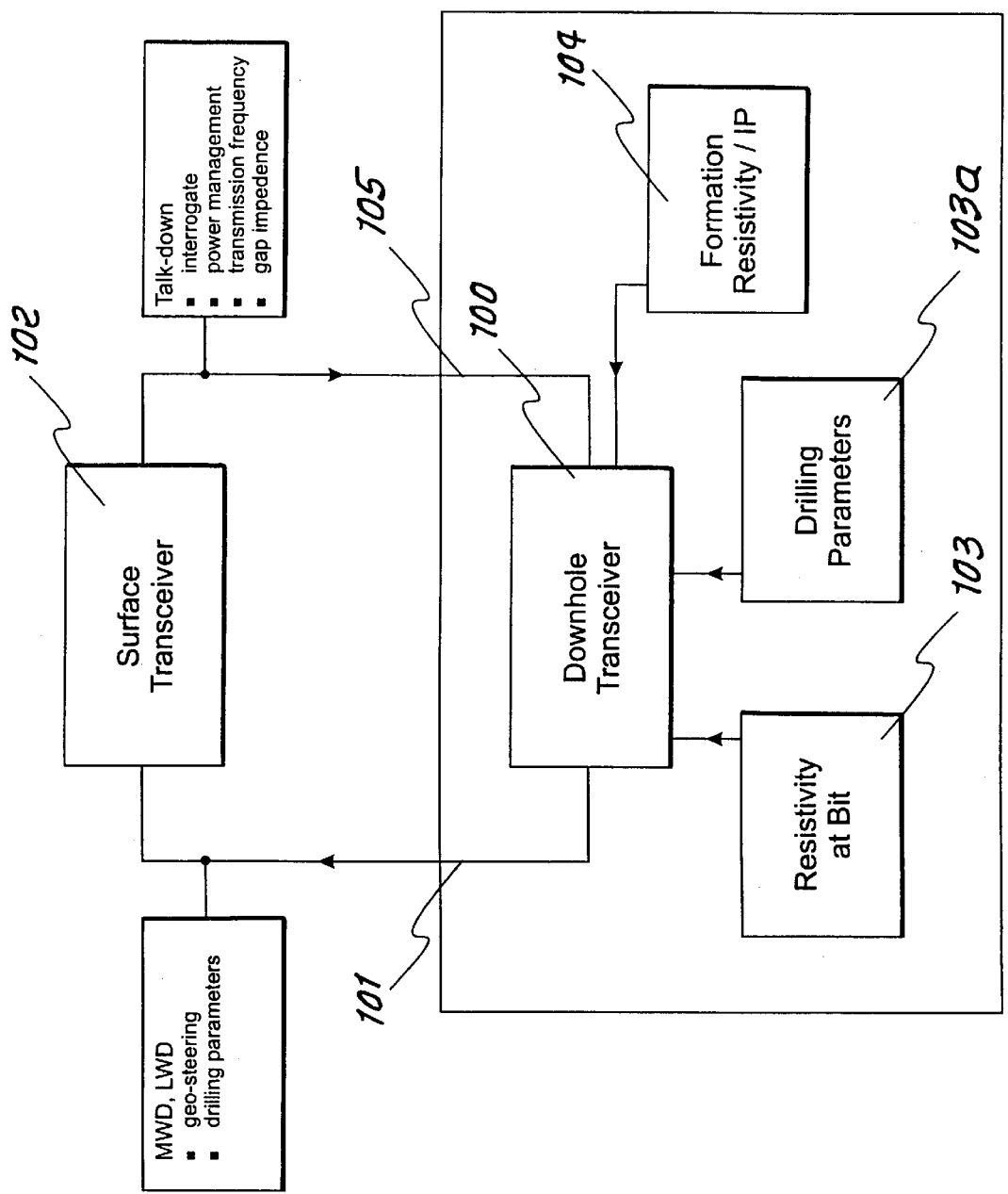

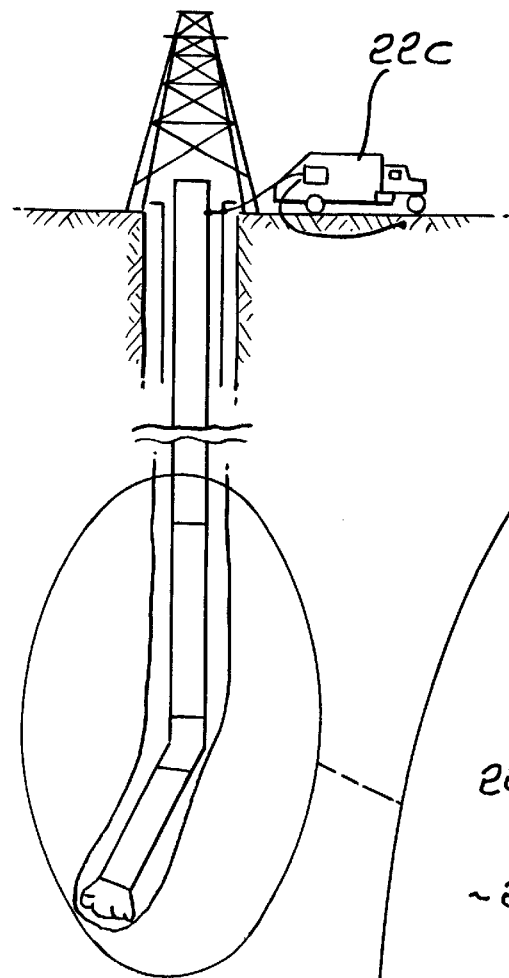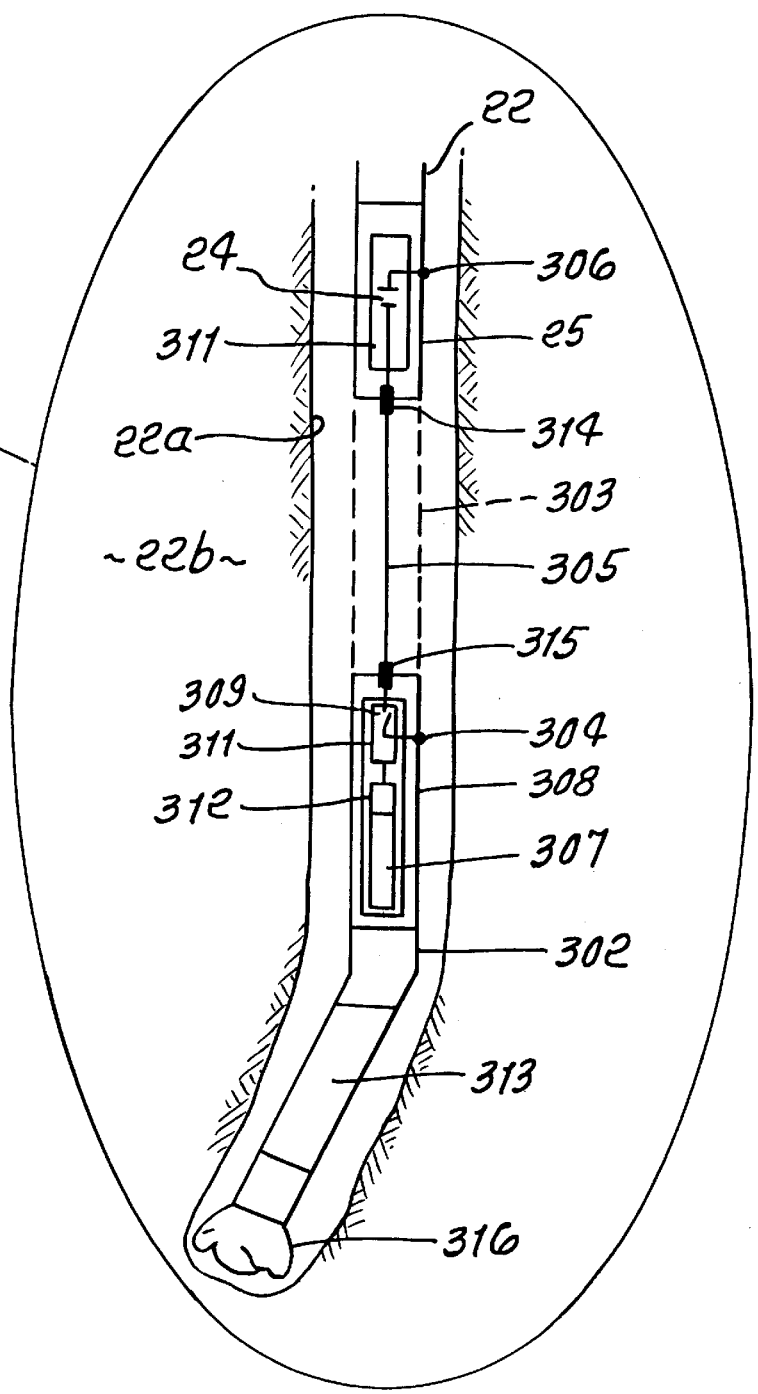
FIG. 1b.

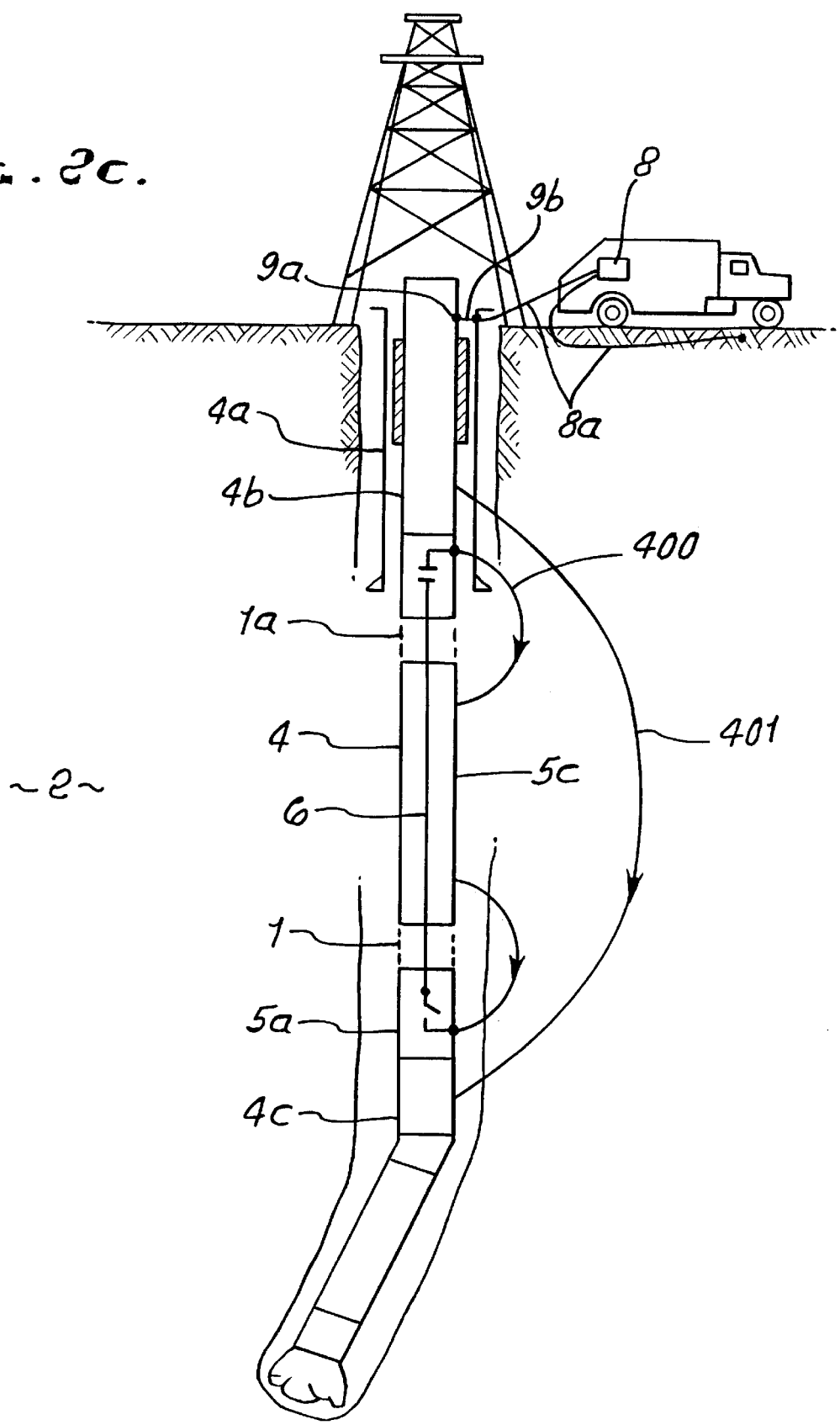

APPARATUS AND METHOD FOR ELECTRIC FIELD TELEMETRY EMPLOYING COMPONENT UPPER AND LOWER HOUSINGS IN A WELL PIPESTRING

BACKGROUND OF THE INVENTION

This application claims priority from provisional application Ser. No. 60/024,794 filed Jul. 31, 1996.

The prior art for electromagnetic drillstring telemetry is based upon inductive (toroidal) or direct coupling of a source signal carrying the downhole sensor information to the drillstring and surrounding formation. Toroidal coupled systems induce a modulated electric current on the drillstring by means of electromagnetic coupling between a (primary) toroidal coil encircling a conductive mandrel connected to the drillstring, and a secondary coil comprising the drillstring, and surrounding formation. The modulated current, which is induced in the secondary, flows along the drillstring and drilling fluid, and through the formation in a pattern, which is governed by the electrical conductivity(s) of the drillstring and drilling fluid, and surrounding formation. The flow of current on the drillstring and through the formation is measured by a receiving apparatus at the surface.

The receiving apparatus is either inductively coupled to the modulated current through a transformer or directly coupled by sensing the potential difference (voltage) produced by the flow of modulated current between electrodes "grounded" at the surface. A previous patent (U.S. Pat. No. 4,181,014 to Zuvela et al.) describes several means of signal reception using sub-surface electrodes connected to the surface by insulated conductors. (See also U.S. Pat. No. 4,980,682 to Klein et al.)

The operation of the inductively coupled (toroidal) downhole transmitter-receiver (transceiver) is enhanced by insulating gaps in the downhole transceiver sub-assembly to isolate the toroidal primary coil from the surrounding drill collar (which would otherwise provide a direct short to the secondary, if it were not electrically isolated). The toroidal-inducing coil encircles an electrically conducting mandrel, which is mechanically and electrically connected to the upper and lower sections of drillstring. The toroidal sub-assembly and associated electronics are designed to provide impedance matching between the source circuitry and the load of the drillstring-formation circuit (U.S. Pat. No. 4,496,174 to McDonald et al., 1985).

In the prior art, the source impedance may be matched with the load using matching transformers (U.S. Pat. No. 2,389,241 to Silverman, 1944; U.S. Pat. No. 4,691,203 to Rubin, 1987). Matching transformers and associated complex electrical circuitry are employed to match the impedance of the downhole sub-assembly electronics to the very low impedance associated with the small gaps necessary to maintain the mechanical stability of the downhole transceiver sub-assembly. One of the herein inventors has previously patented an apparatus for electromechanical impedance matching (U.S. Pat. No. 5,130,706 to Van Steenwyk, 1992).

Transformer coupled electric-field telemetry systems require that the signal information be transmitted by various forms of modulation of a carrier signal. Pulse modulated systems have been described (U.S. Pat. No. 3,046,474 to Arps, 1962; U.S. Pat. No. 4,015,234 to Krebs, 1977); but these systems have required the generation of a very high-voltage pulse by means of capacitor discharge to overcome the poor impedance match between the downhole transmitter and the drillstring-formation load impedance.

More recently, a low-voltage, low-impedance, current generator has been described (U.S. Pat. No. 5,270,703 to Guest). It should be noted that none of these methods for coupling a pulse to the drillstring-formation path are suited to a talk-down capability. See also U.S. Pat. No. 4,684,946 to Geoservice.

SUMMARY OF THE INVENTION

The present invention relates to a method and apparatus to improve the effectiveness of electric-field borehole telemetry. A direct-coupled electromagnetic telemetry system is provided in which the downhole source drives a modulated electric current directly into the underground formation by means of a modulated voltage or current applied across an electrically insulating gap created in the drillstring by one or more gap sub-assemblies.

Another aspect of the invention is directed to the use of insulating drill collars and wireline components, to match the downhole impedance of electric signal transmitter circuitry to the electrical impedance of the surrounding drilling fluids and geologic formations. By means of this aspect of the invention, downhole power requirements can be significantly reduced.

Another feature of the invention is the use of the downhole electric fields generated by the telemetry apparatus for formation resistivity and induced polarization measurements. By using insulating drill collars and wireline components to vary transmitter and receiver electrode spacing and configuration, many of the methods of surface resistivity and induced polarization available to surface geophysics can be deployed on the drillstring, in conjunction with a downhole electric field telemetry system.

The invention provides a method and apparatus to configure an insulating gap in a drillstring or borehole casing, so as to enable the generation or detection of electric fields on the surface of the drillstring or borehole casing. The method can be used in the transmission of downhole measurements and drilling parameters from the drillstring to the surface, the transmission of control signals from the surface to any point on the drillstring, and the evaluation of resistivity and induced polarization response of the formation surrounding the drillstring, formation at the bit, or formation surrounding a cased borehole.

These and other objects and advantages of the invention, as well as the details of an illustrative embodiment, will be more fully understood from the following specification and drawings, in which:

DRAWING DESCRIPTION

FIG. 1a shows elements of the invention in block diagram form;

FIG. 1b is a section showing details of the apparatus incorporating the invention;

Figure 2A:
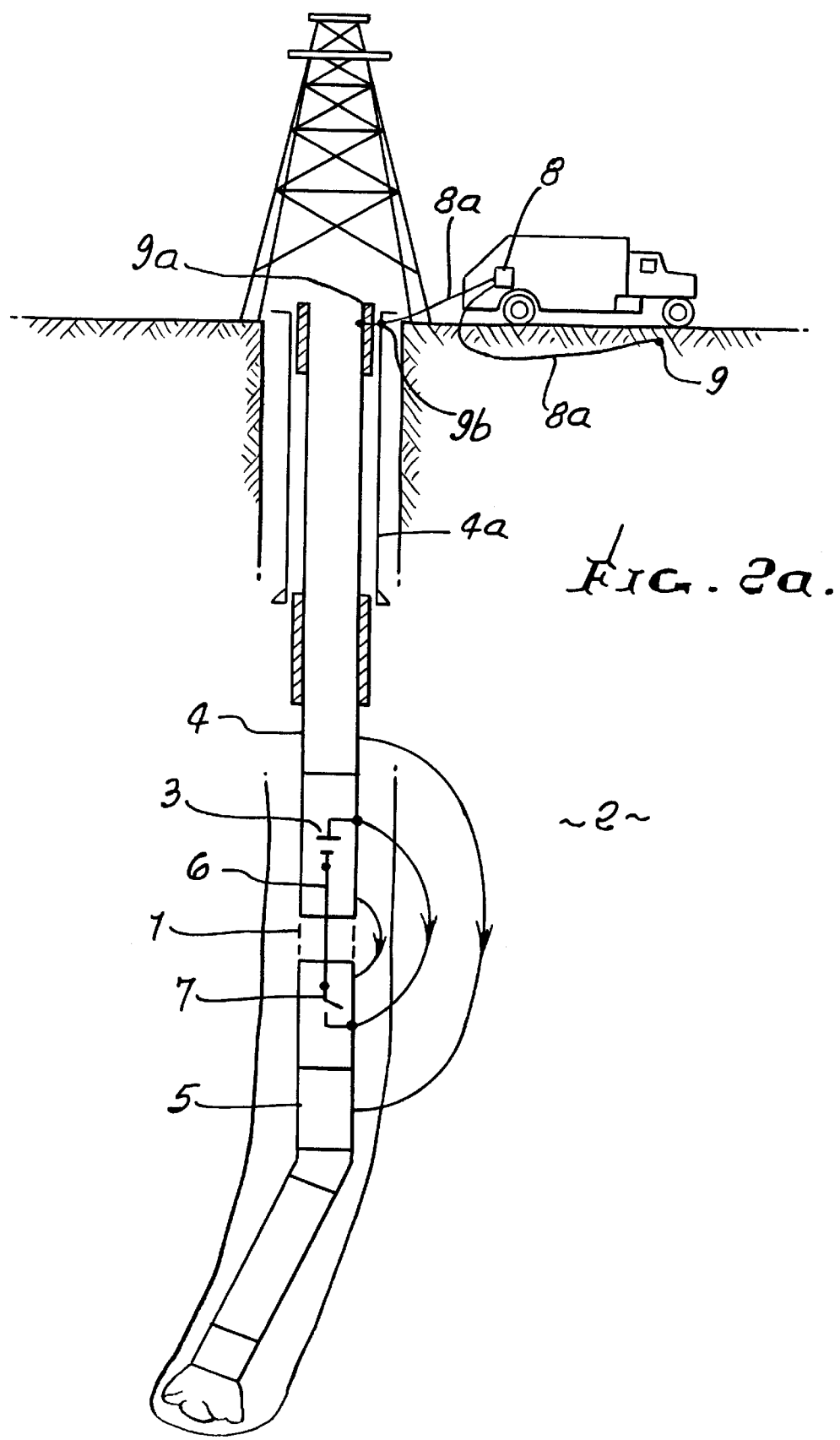
Figure 2B:
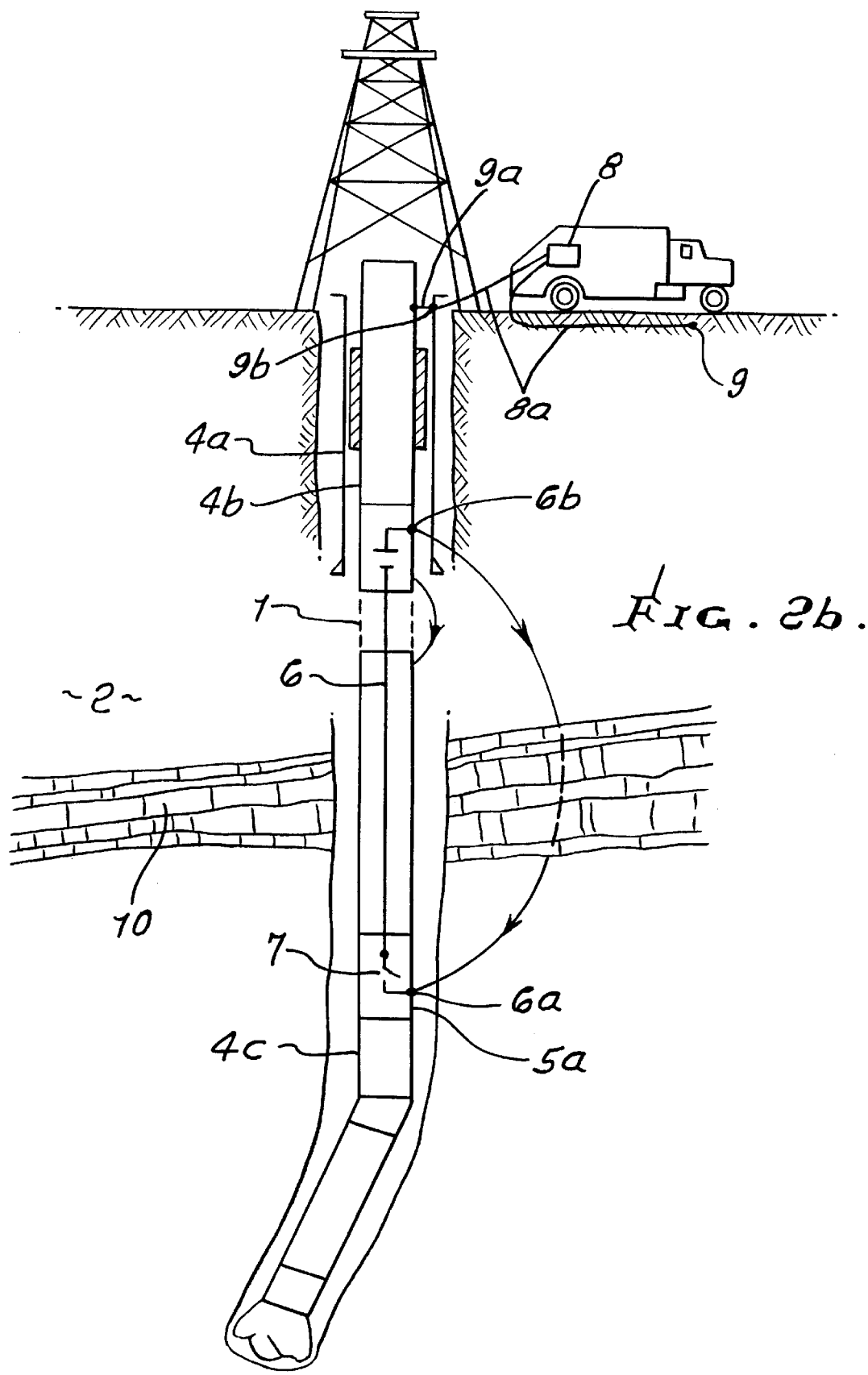
Figure 3:
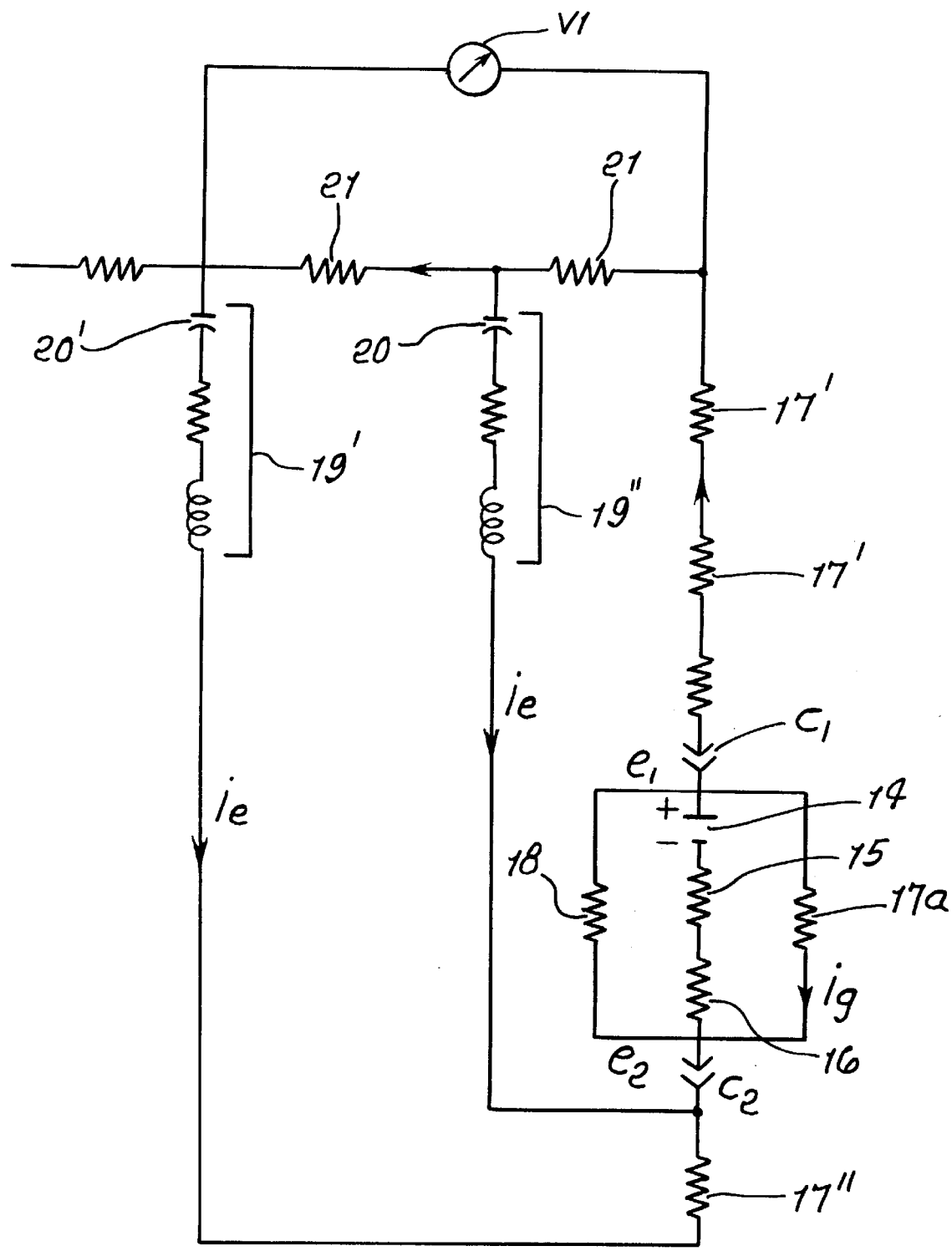
Figure 4:
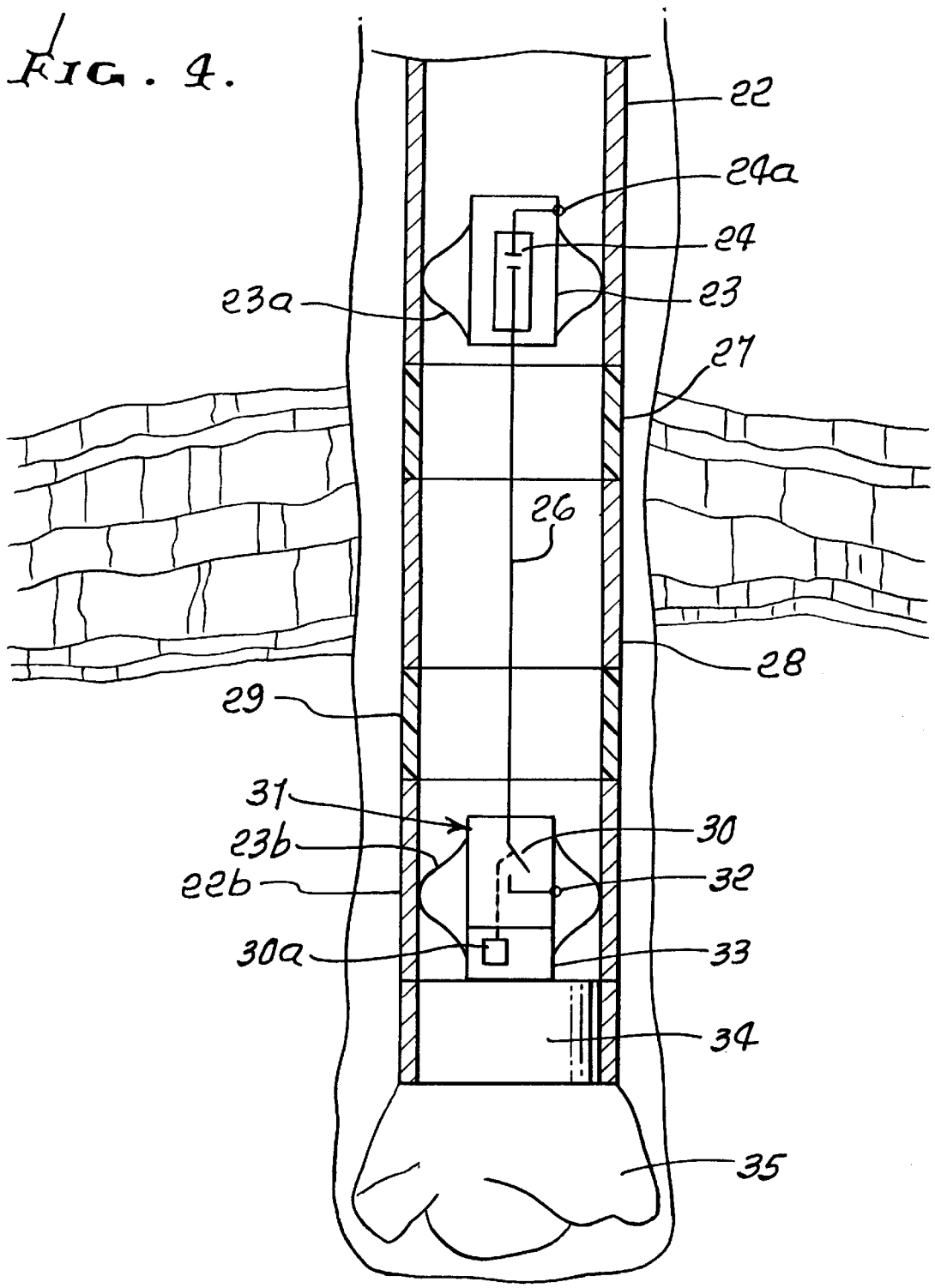
Figure 5:
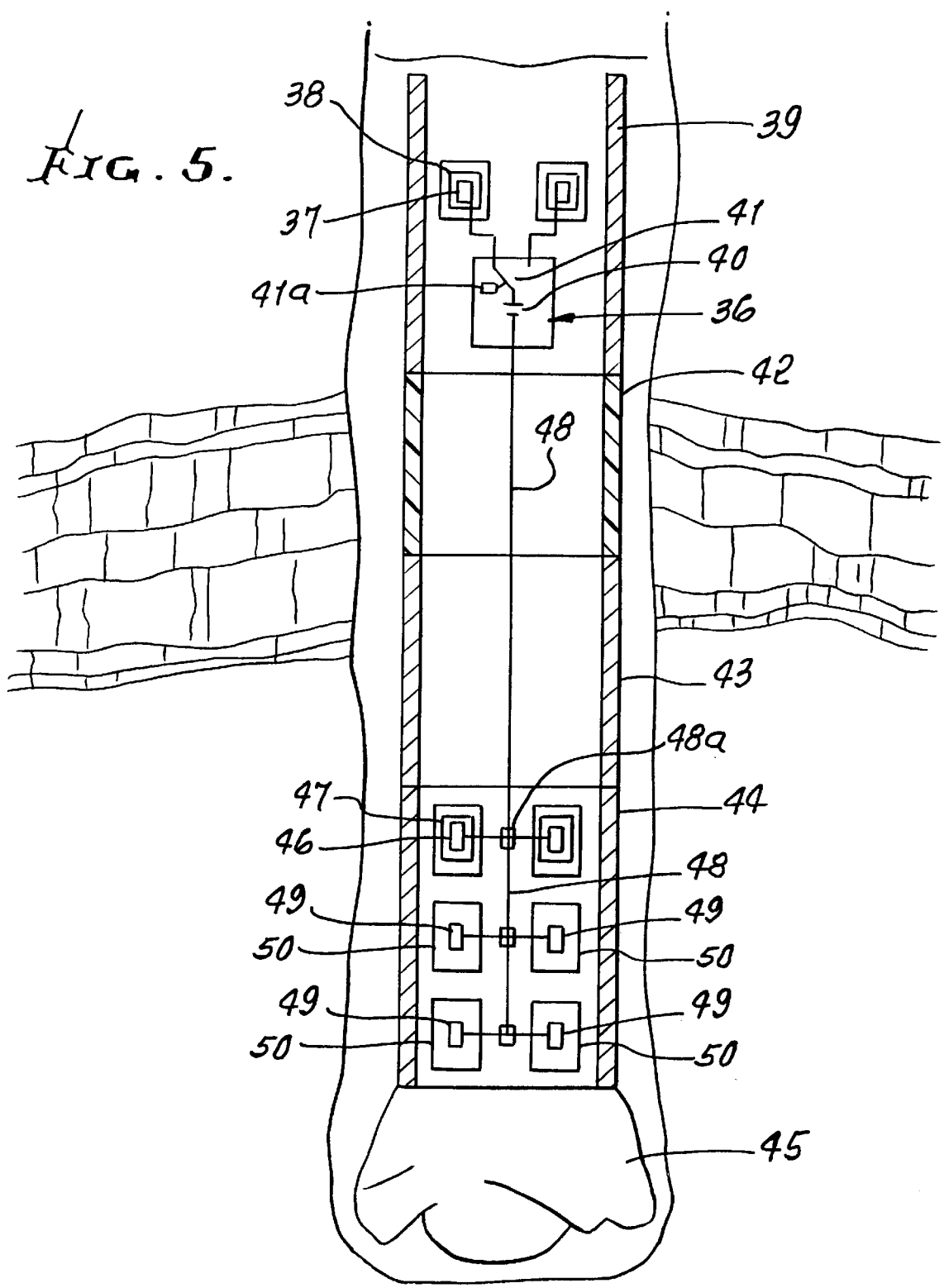
Figure 6:
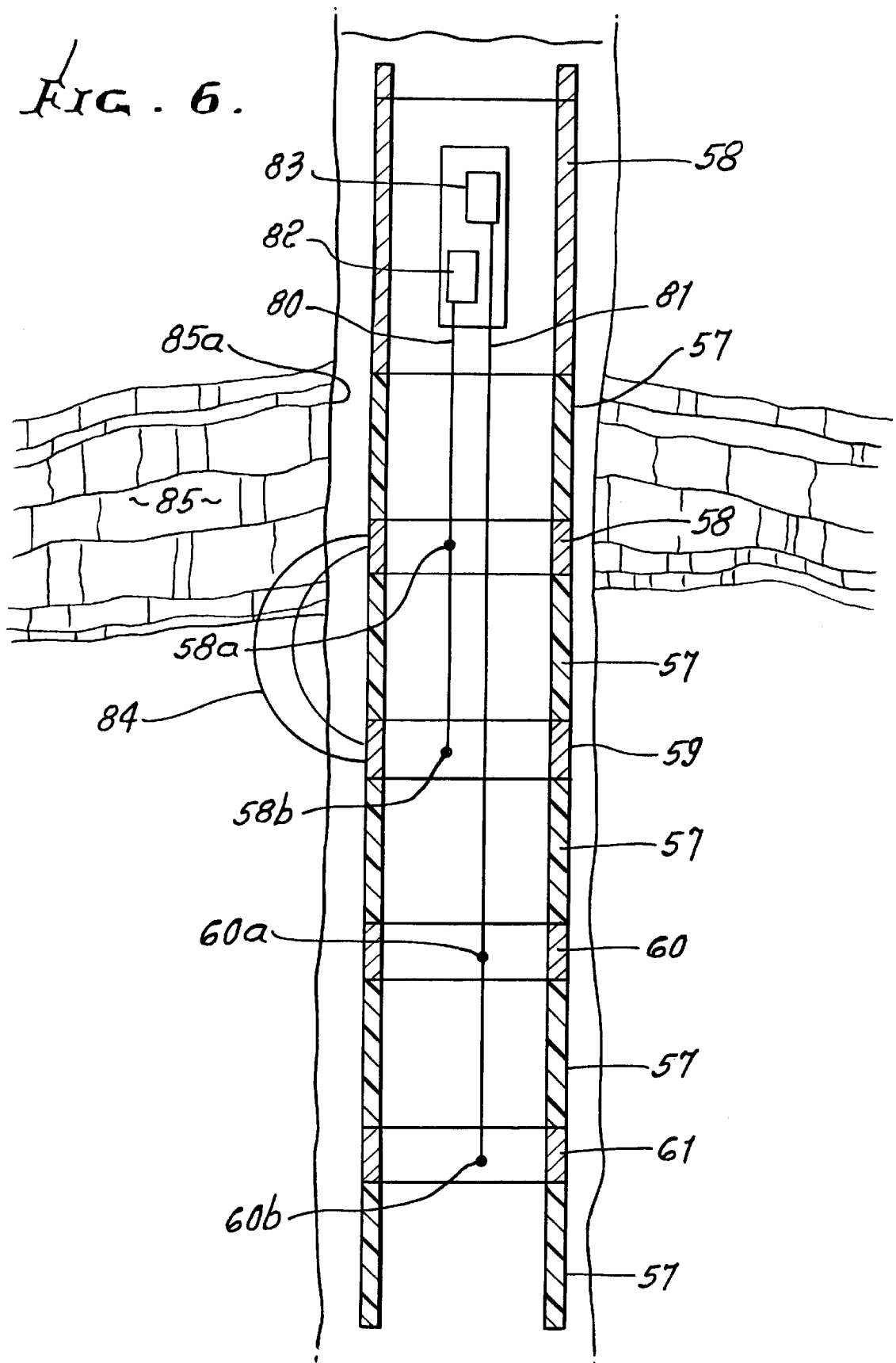
Figure 7:
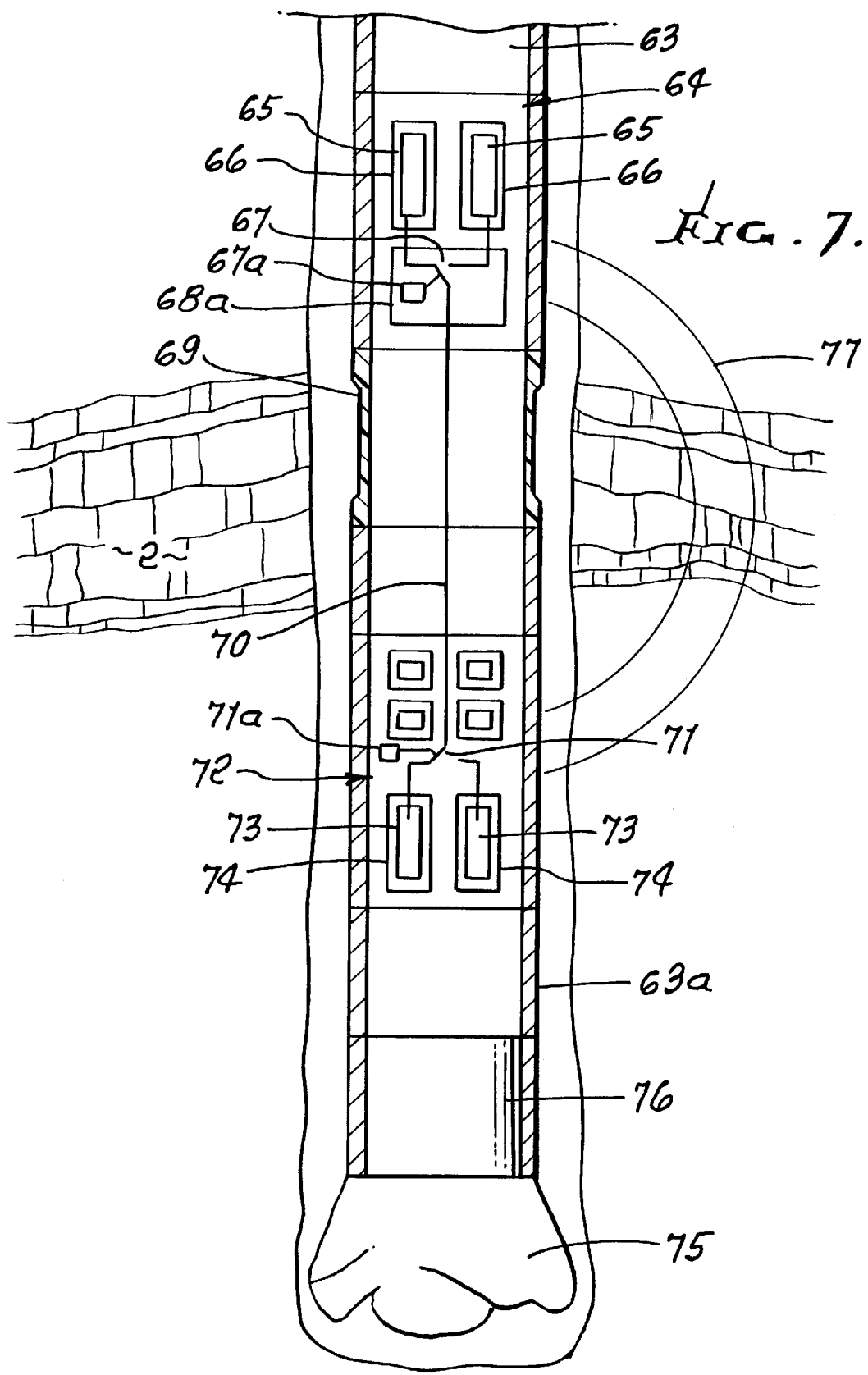
Figure 8:
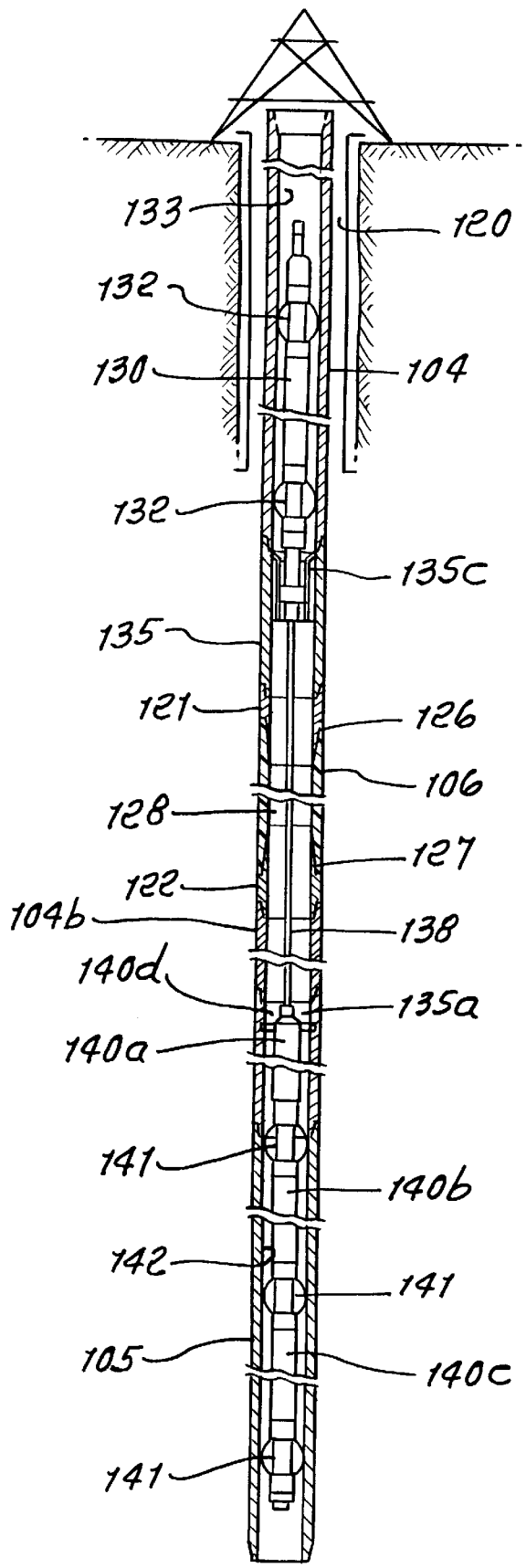
Figure 9:
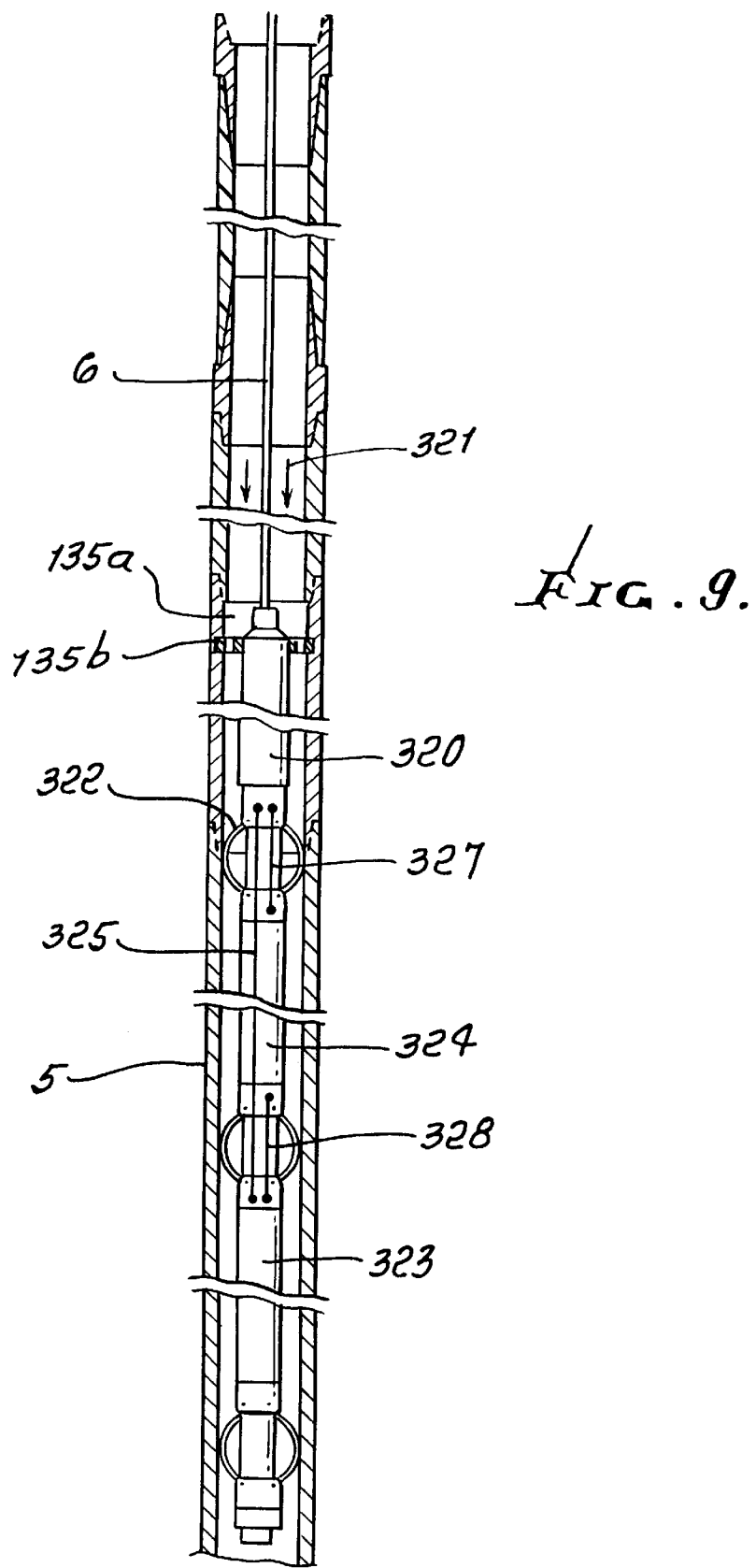
Figure 10:
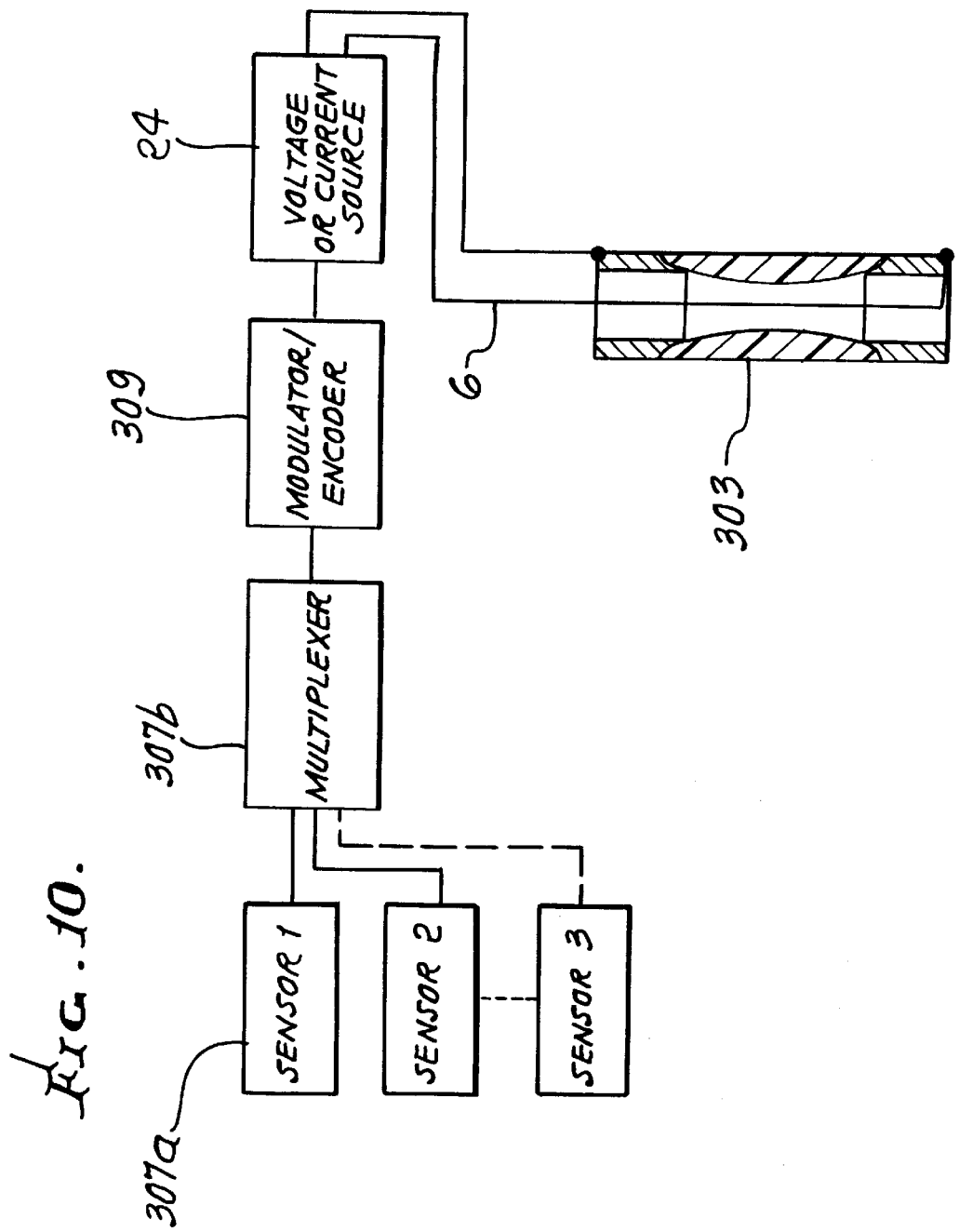
Figure 11:
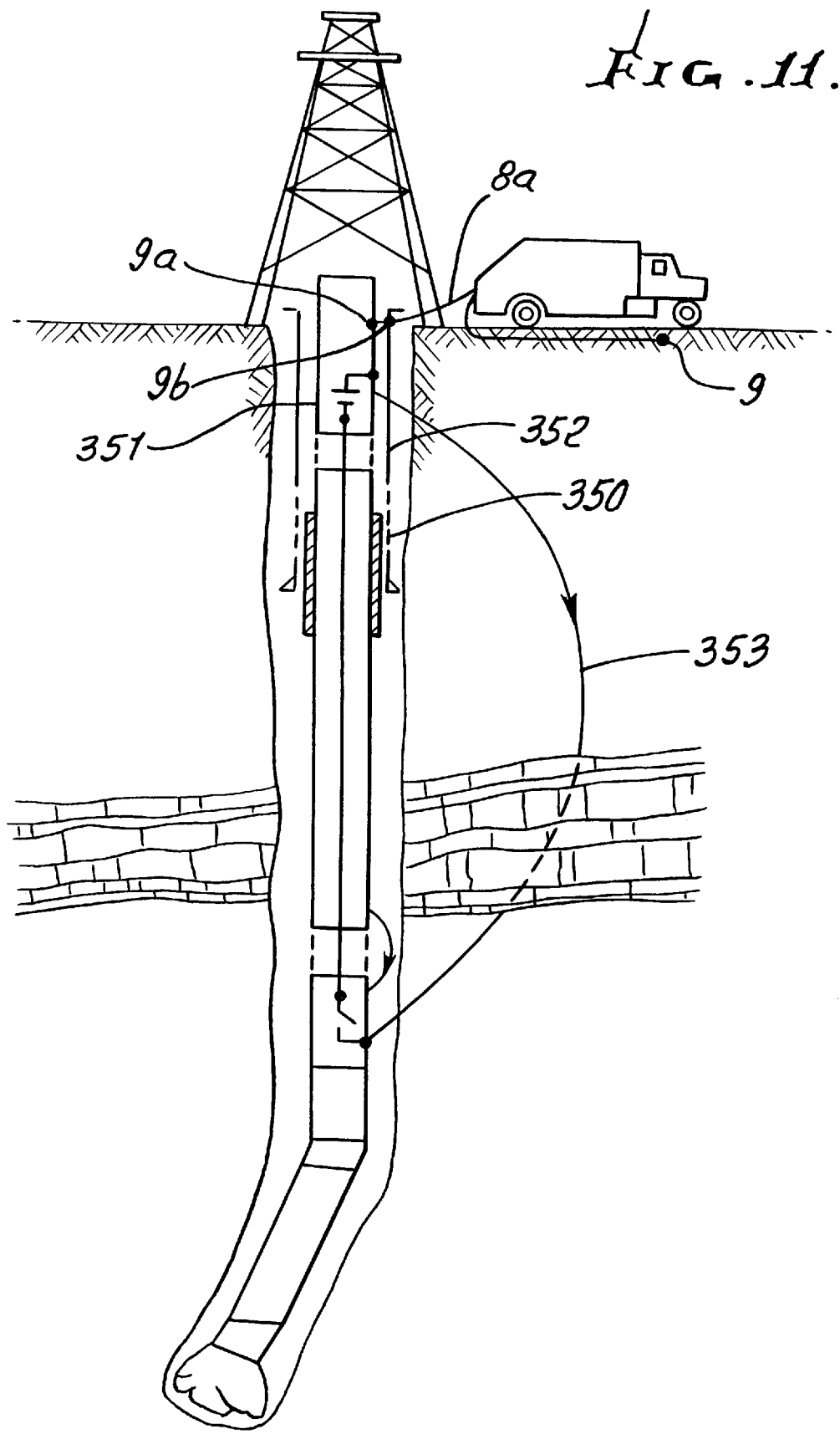
Figure 12:
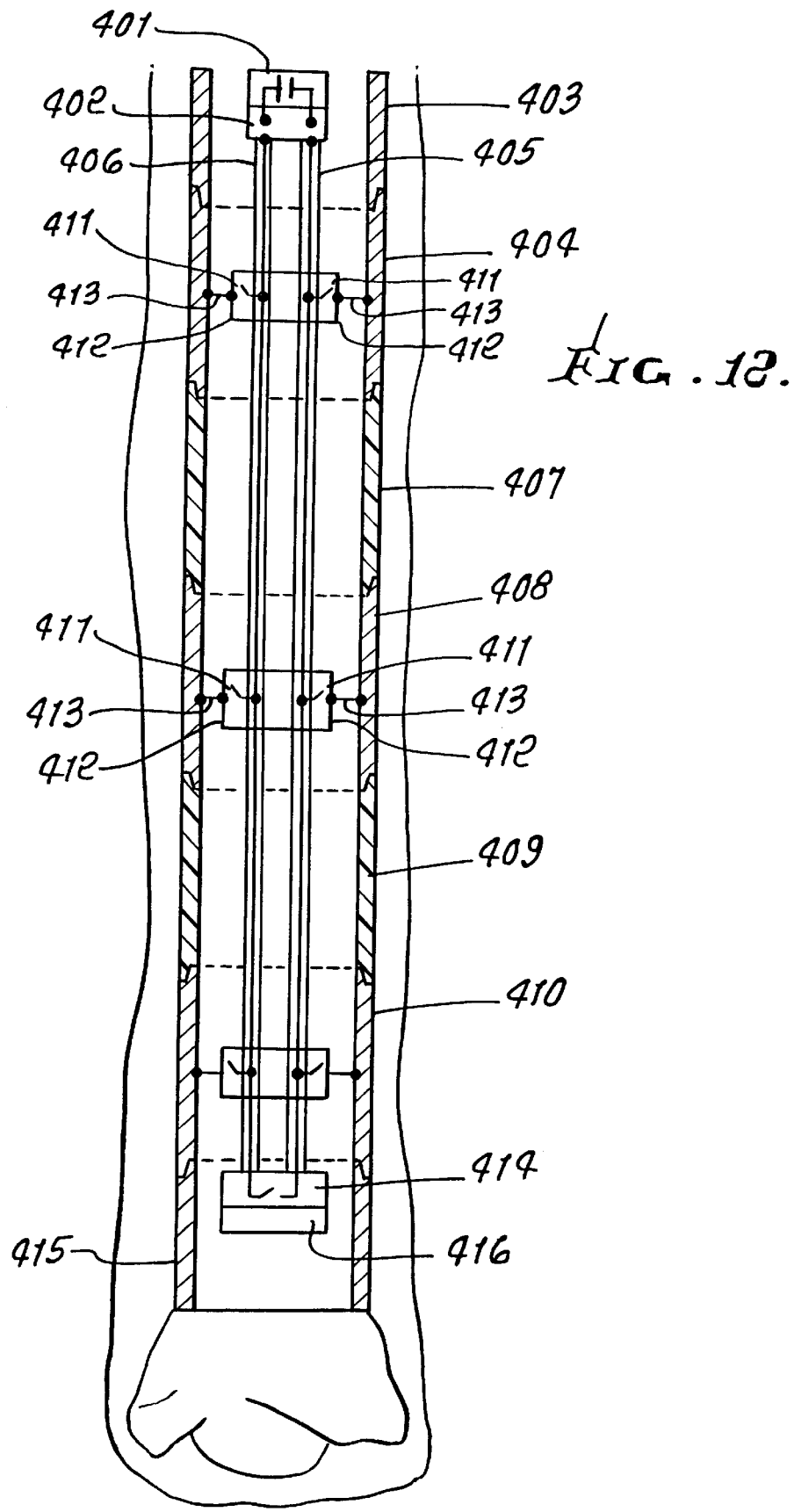
Figure 13:
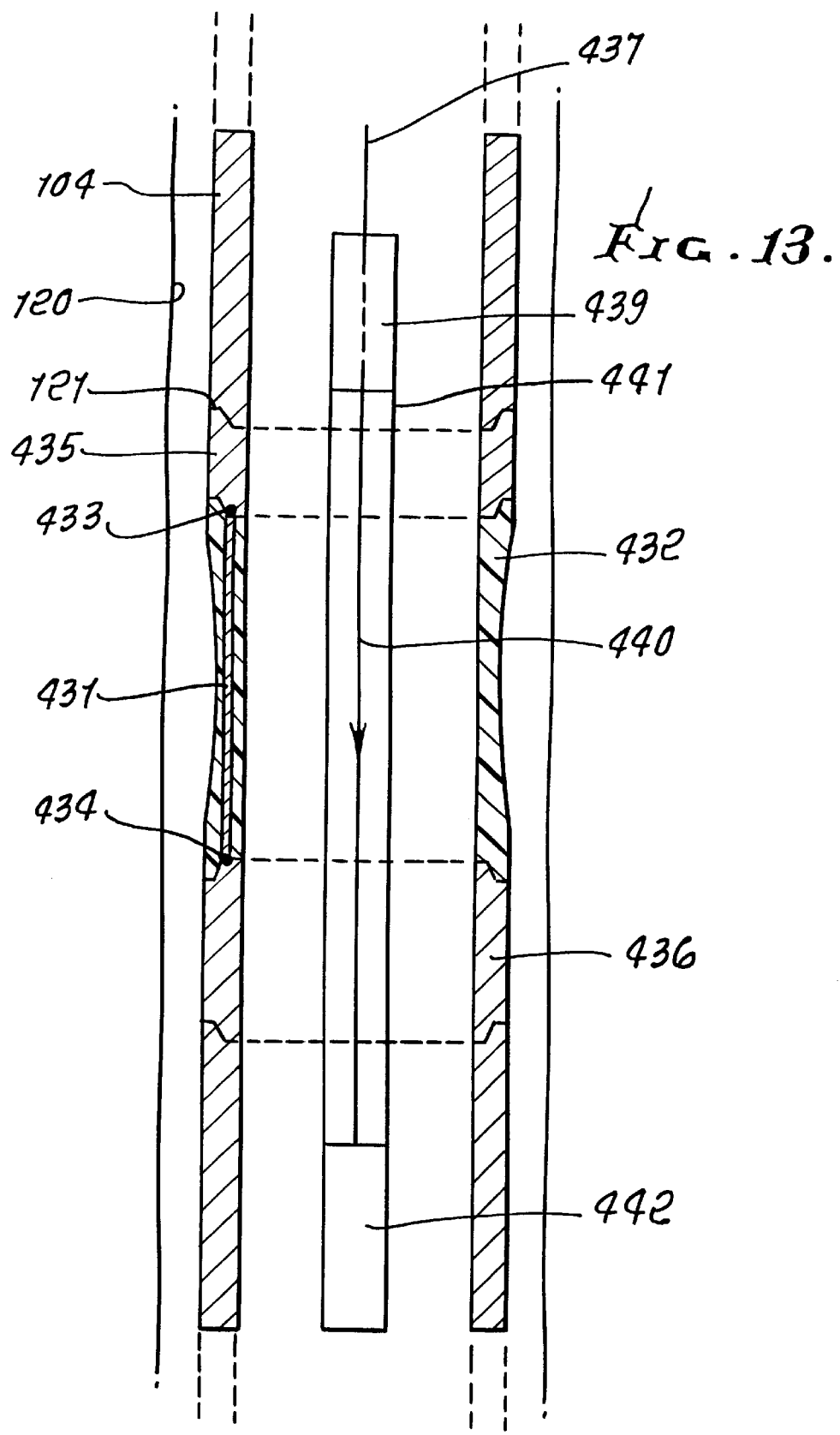
Figure 14:
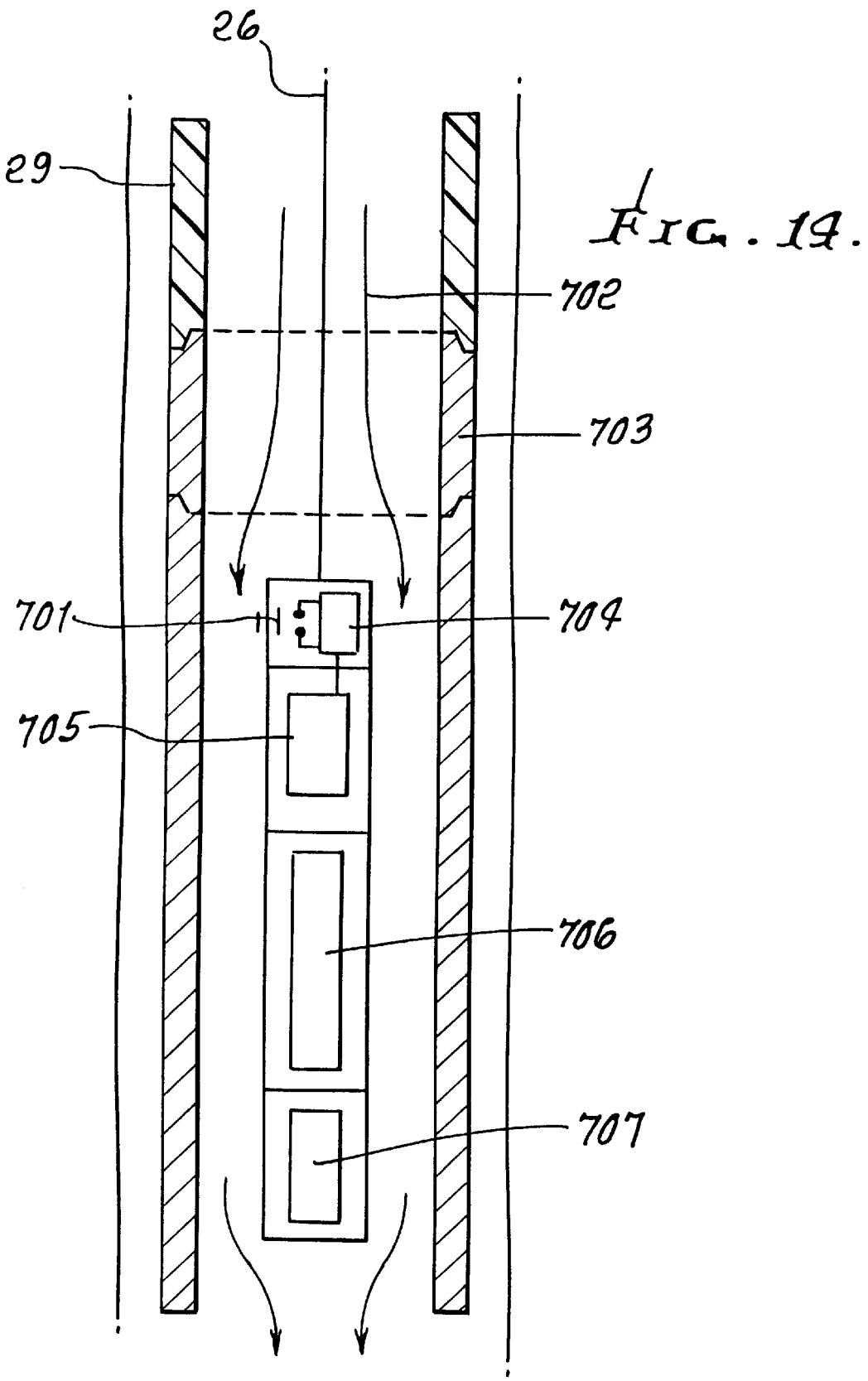
Figure 15:
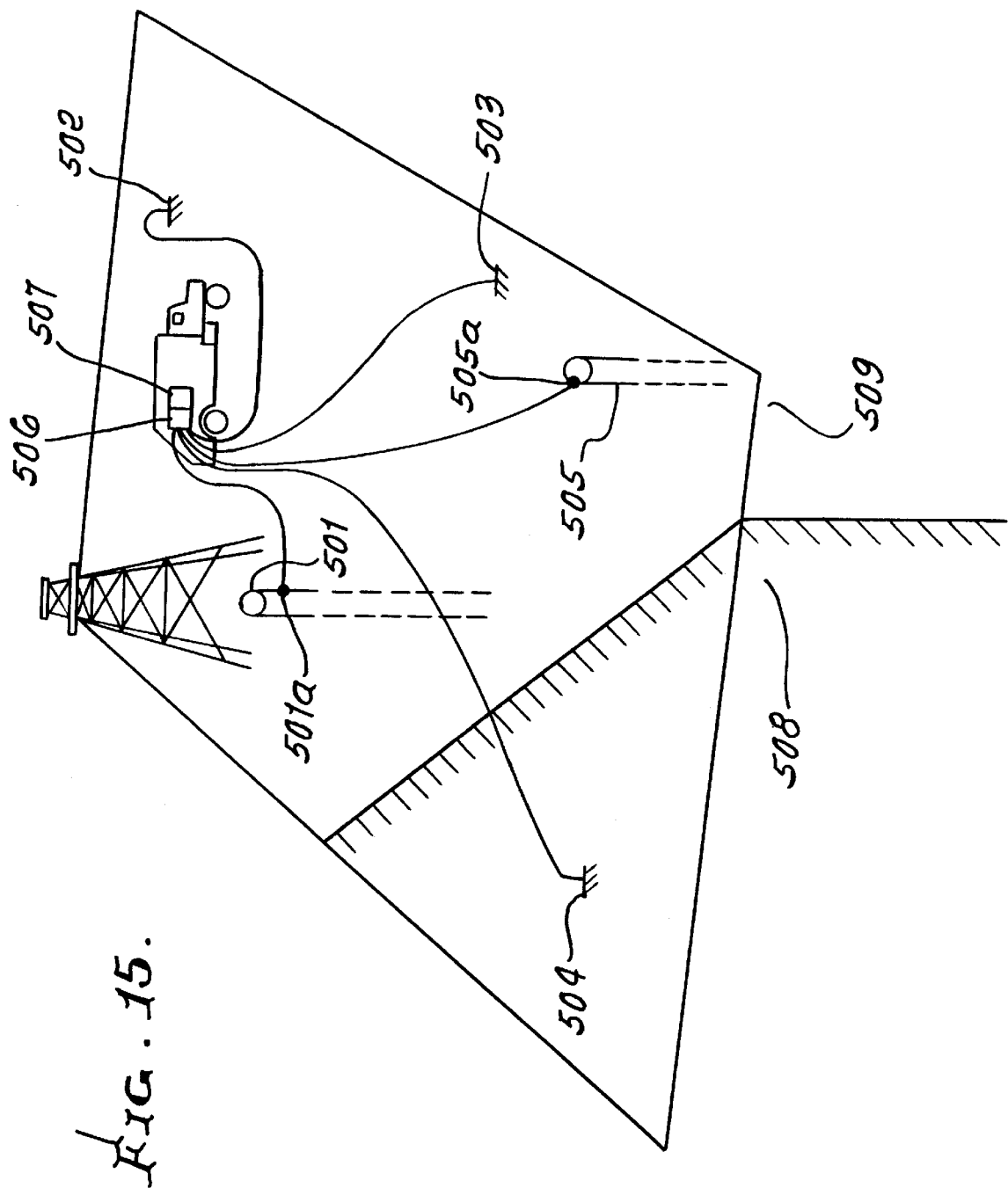

FIGS. 2a, 2b and 2c show the basic components of the invention in three possible configurations; FIG. 2a shows the invention configured with a single insulating gap; FIG. 2b shows the invention configured with the gap positioned uphole of a high resistivity rock layer; FIG. 2c shows the invention configured with two gaps;

FIG. 3 shows an equivalent circuit diagram of the transmission path used by the invention for downhole telemetry and formation evaluation;

FIG. 4 shows details of the bottom hole assembly for a two-gap configuration of the invention;

FIG. 5 shows the invention configured for azimuthal resistivity-at-bit measurements;

FIG. 6 shows the invention configured for formation resistivity and induced polarization response measurements above a motor that drives a drill bit;

FIG. 7 shows the invention configured for azimuthal resistivity and induced polarization evaluation in the formation adjacent to the borehole;

FIG. 8 is a more detailed view showing components in a drillstring;

FIG. 9 is a section showing details of switching and sensor modules;

FIG. 10 is a block diagram;

FIG. 11 is a section showing adaptation to use with well casing;

FIG. 12 is a section showing use of multiple wirelines;

FIG. 13 shows details of insulative gap construction;

FIG. 14 shows use of a well fluid pressure responsive switch;

FIG. 15 shows use of multiple receiver electrodes; and

Figure 16:
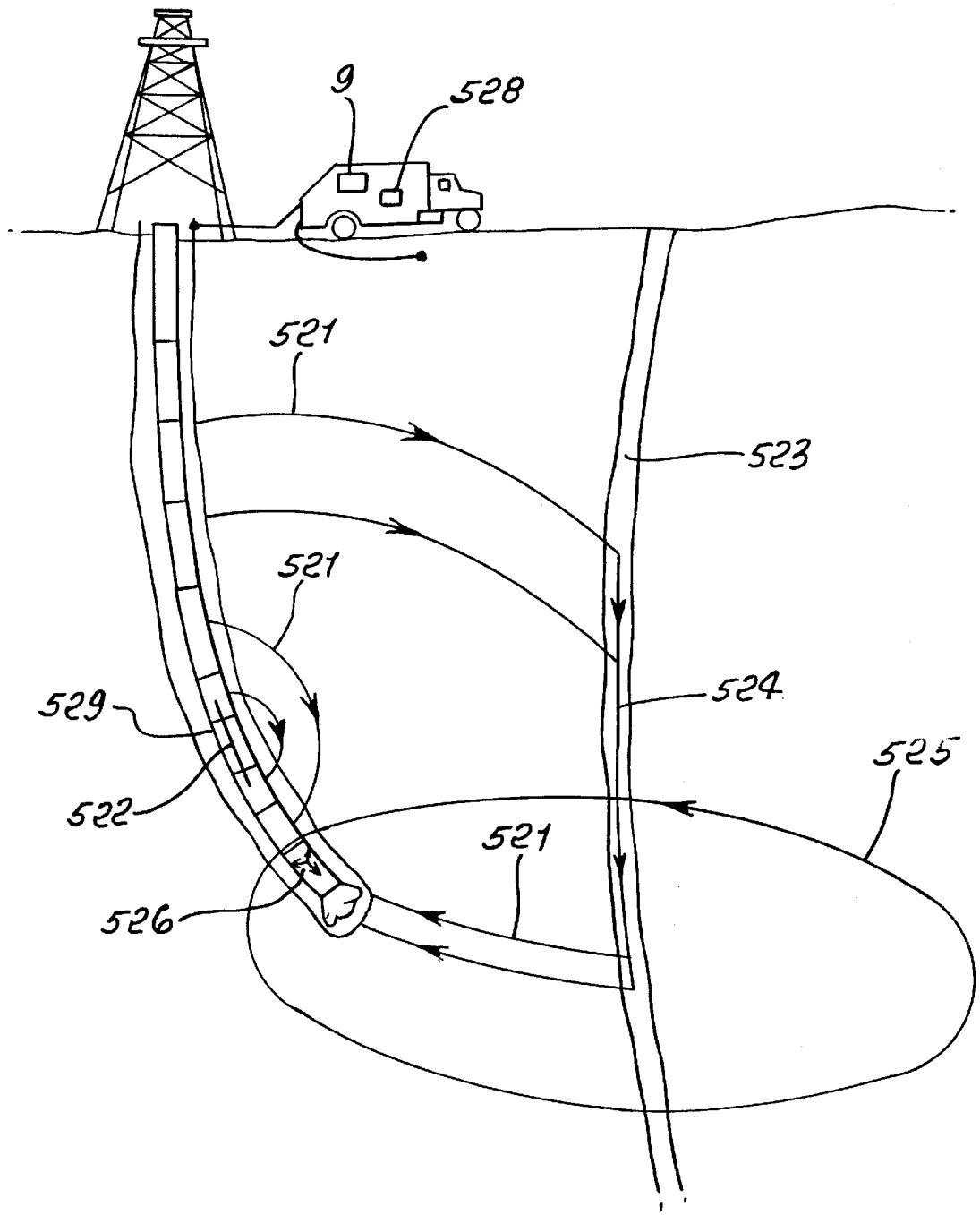

FIG. 16 shows target detection by means of the invention.

DETAILED DESCRIPTION

The mechanical limitations imposed by the prior art of toroidal coupled borehole telemetry systems, and the difficulties in matching the drillstring-formation impedance of a short-gap, direct-coupled system are addressed by the present invention. By providing insulated drill collars or gap sub-assemblies used in conjunction with electric current supplying components and circuits, the invention provides direct coupled impedance matching, optimum location of the transmission gap in complex geologic systems, and the integration of formation evaluation geo-steering, and downhole telemetry, in a single system.

In certain embodiments of the invention, a direct coupled impedance match, or near match, to the drillstring-formation transmission path is provided. By proper selection of one or more insulated drill collars or gap sub-assemblies and conventional drill collars, the drillstring is configured to present an electrical impedance match between the downhole electric-field telemetry system and the surrounding formation. An insulated wireline may connect upper and lower sub-assemblies for completing an electrical circuit comprised of the upper drillstring, power source, wireline, bottom hole assembly, and formation.

A block diagram of the invention is shown in FIG. 1a. A downhole transceiver 100 transmits at 101 either drilling parameters or the results of formation evaluation measurements to a transceiver 102 at the surface, or receives signals from a surface transmitter for power management or other control requirements. Note transducers or sensors 103, 103a, and 104 supplying data to the transreceiver. The same instrumentation is used for both downhole telemetry and evaluation of formation resistivity and induced polarization (IP) response. Note transmission line 105 from 102 to 100.

FIG. 1b shows the invention in a measurement-while-drilling (MWD) application. A bent sub-assembly means 302 in the drillstring provides directional control for the drilling operations. Voltage application apparatus is shown in the string and includes battery 24, insulated wireline 305, connected at connections 314 and 315 to upper and lower instrument housings 311 and 312, which house components, such as batteries, sensors and switching apparatus. Voltage or current is applied by electrical contact means 306 and 304 to the drillstring, and then to the formation. A borehole drill motor 313 is shown in the string above the drill bit 316.

Upper extent of the string is indicated at 22, and the borehole appears at 22a, in formation 22b. A circuitry housing appears at 307. Surface equipment appears at 22c.

FIGS. 2a, 2b and 2c illustrate three possible configurations of the system used as a means of downhole electric-field telemetry. In each configuration, a voltage is impressed across an insulated drill collar 1, between upper and lower steel drillstring sections 4 and 5, and drives an electric current through the earth 2. In configuration of FIG. 2a, a power source 3 is connected across an upper section 4 of the drillstring, and a lower section 5 of the drillstring, as by wireline components 6 and a signal source (modulator) indicated as a switch 7, which opens and closes as a function of data to be transmitted, as via a path defined by the drillstring 4 and 5, and the formation 2. Sections 4 and 5 are typically metallic (steel), and collar 1 is in series with 4 and 5.

Signals are detected at the surface of the earth by a receiver 8, which measures the voltage produced by the downhole transmitter, as between two electrodes associated with 8 at the surface. Receiver 8 is in a line 8a connected between the upper end of the string 4 and 9a, and a probe 9 into the earth. Note the possible connection 9b to the steel casing in the borehole. In the configurations shown, one electrode comprises an electrical attachment to the drillstring, and the other electrode 9 is connected directly to the earth.

In FIG. 2b, the insulating section 1 of the drillstring is positioned above the level of a high resistive layer 10 of the formation through which wireline components extend, thus permitting the transmission of downhole information through an insulating geologic formation. Note connection at 6a of line 6 to string section 5a extending below 10, and connection at 6b to string section 4b above 1. The drillstring sections 4b and 5a consist of steel. Borehole casing is indicated at 4a.

In FIG. 2c, multiple metallic sections 4b, 4c, 5a, and 5c of the drillstring are interconnected by insulated sections or collars 1 and 1a. An electrical line 6 interconnects 4b and 5a to provide an impedance match and to extend the effective length of the insulating gap. Other elements remain as shown in FIG. 2b. Current flow in the formation appears at 400 and 401.

An alternate means of telemetry from a downhole location to the surface is implemented by modulating the impedance of the entire assembly as measured from surface connections 9 and 9a. A downhole means for alternately electrically connecting and disconnecting portions of the drillstring is provided by using an appropriately positioned gap or gaps 1 in the drillstring sections electrically connected by insulated wireline components 6 and a switching means 7. In this method, the only electrical power required for this means of downhole telemetry is that required for the operation of the electrical switch, thus eliminating the need for downhole power source 3.

FIG. 3 shows an electrical circuit equivalent of the drillstring-earth transmission path. The FIG. 3 elements are defined as follows:

17a very large resistance of the "gap", i.e., insulated drill collar 1

17' resistance of metallic drillstring section 4 above 17a

17" resistance of metallic drillstring section 5 below 17a 14 battery 3

15 internal impedance of battery 16 resistance of wireline 6

$C_1$ upper end connection of wireline 6 to drillstring upper section 4

$C_2$ lower end connection of wireline 6 to drillstring lower section 5

21 resistance of current path at earth surface 18 electrical resistance of drilling mud (between drillstring and earth bore) between $C_1$ and $C_2$ levels 19" electrical impedance of the formation proximate to the borehole above level of $C_1$ and upper end of drillstring 20 effective capacitance of the formation proximate to the borehole mud above level of C, and upper end of drillstring $e_1$ current between $C_1$ drilling mud $e_2$ current between drilling mud and $C_2$ 19' effective electrical impedance of earth formation between electrode 9 and lower section 5 of drillstring 20' effective capacitance of earth formation between electrode 9 and lower section 5 of drillstring $V_1$ measured voltage between upper end of drillstring (and drilling mud), and probe 9.

Note that voltage difference $e_1$–$e_2$ is maintained by current flow $i_g$ across the gap 17a. The voltage across the gap is determined largely by the downhole source voltage at 14, the internal resistance 15 of the source 14 and wireline 16, and the resistance 18 of the fluids (mud) in the annulus surrounding the gap sub-assembly. The voltage across the gap drives a current $i_e$ into the earth 2. This flow of current at the surfaces produces a voltage drop ($V_1$) across the resistance 21 of the earth at the surface. The voltage $V_1$ is measured by the receiver electronics.

Mechanical detail of a two-gap form of the downhole assembly portion of the invention is shown in FIG. 4. The bottom hole assembly is either mounted above a downhole motor 34 or one or more drill collars. The upper metallic drillstring section 22 is electrically connected to an upper electrical power source, here represented by a battery 24, as via connection 24a, housing 23, and centralizer bowed spring 23a engaging the string bore. Insulated wireline 26, connected to the battery, extends from the lower end of the upper sub-assembly downwardly through one or more insulting drill collars 27 and 29, and one or more intermediate, conventional, metallic drill collars 28, to a lower control sub-assembly 31, and a sensor sub-assembly 33.

A drive for the switch 30, in series with line 26, is shown at 30a. The drive is modulated by the output of sensor 33. Line 26 electrically connects at 32 to the housing 31, connected to conductive spring 23b, which electrically engages the bore of lower drillstring section 22b. The sensor sub-assembly may be located above the motor 34, as shown, or in an instrumentation mandrel (bit box) directly above the bit. Motor 34 drives (rotates) drill bit 35.

Reference is now made to FIG. 5. In addition to downhole telemetry, the invention provides a means for evaluation of resistivity and induced polarization (IP) response at the bit, in the formation surrounding the drillstring or in the formation surrounding a cased borehole. By generating an electric field in the surrounding medium, i.e., formation, and with multiple current or voltage-sensing electrodes placed on the drillstring, at the bit, or on the casing of a cased borehole, the resistivity and IP response of the surrounding medium can be measured.

To evaluate formation resistivity and IP response at and directly ahead of the bit, a voltage pulse waveform, or a set of selected frequencies, is applied across an impedance matched insulated gap or gaps in the drillstring and drill collars configured as shown in FIG. 5. The bulk resistivity of the formation surrounding the insulated gap, drill collar or motor, bit-box, and bit can then be determined by well known data reduction methods for geophysical interpretation of formation resistivity and IP response. The resistivity at the bit is analytically separated from the bulk resistivity surrounding the bottom hole assembly by noting that, as the bottom hole assembly passes through a formation and the resistivity is measured, changes in the bulk resistivity will be due to resistivity changes at the bit.

Referring to the schematic showing of FIG. 5, an upper power and control sub-assembly 36 having one or more current 37 and guard 38 electrodes is mounted on or in and insulated from the drillstring 39. This sub-assembly also carries a power source 40 and control and switching electronics 41. See also driver 41a for switch arm 41. An insulated tubular drill collar or gap sub-assembly 42 separates the upper power and control sub-assembly from the motor housing or lower metallic drill collars 43.

A resistivity-at-bit lower sub-assembly capable of azimuthal measurements is housed by a tubular mandrel 44 extending downwardly from the motor 43. This mandrel carries an instrumentation package directly above the bit 45. The instrument package comprises a set of one or more guarded or unguarded current electrodes 46 mounted on and insulated from the mandrel or drill collar; and a means 48a is provided for connecting lower extent of the wireline 48 to the current electrodes 46 individually, or in combination, at each level. Each electrode is shown as surrounded by an insulated guard electrode 47 and associated electronics to provide focusing and to reduce return currents along the motor housing or drill collar. Accordingly, electrical field "lines" can be established at different azimuth locations about the string axis.

Multiple voltage sensing electrodes 49 are mounted on insulated pads 50 on the mandrel. The potential difference between the various voltage sensors is selected from the upper control sub-assembly via wireline connections 48 from the upper sub-assembly electrodes to the bit box electrodes through the drill collars and/or motor housing. FIG. 5 also represents the combined use of MWD (measure while drilling) technique, together with one of multiple electrodes, as referred to, to measure formation properties. Measured voltage or current values are either interpreted as formation resistivity or IP at control sub-assembly for transmission to the surface by the methods described in the previous paragraph, or the values themselves are transmitted to the surface for interpretation. In this case, the results of formation evaluation are equivalent to sensor output.

By proper configuration of insulated drill collars or gap sub-assemblies, electrodes, and wireline connections, a unique borehole application of the surface geophysical dipole-dipole resistivity technique is possible. FIG. 6 schematically illustrates this configuration. Other similar configurations are possible corresponding to the various electrode configurations developed for (surface) resistivity and IP measurements. Using this configuration, one or more gap sub-assemblies and wireline system components are used to provide formation resistivity measurements at distances from the borehole previously unobtainable by the prior art.

In FIG. 6, a series of insulated, tubular drill collars or gap sub-assemblies 57, and electrically conducting drill collars or sections of drillstring 58 and 59 are connected in a dipole-dipole configuration, in accordance with known surface geophysics. A voltage is applied via source 82 by conductor means 80 and connection means 58a and 58b across conducting sections 58 and 59, which act as effective current electrodes.

Electric current 84 is thereby driven from the conducting sections into the formation 85 surrounding the borehole 85a. Receiver means 83 is electrically connected to conducting sections 60 and 61 by conductor means 81, and connection means 60a and 60b, and the receiver means detects the potential difference between such conducting sections, which act as effective potential electrodes. By interpretive means known in the art of surface geophysics, the electrical resistivity of the formation surrounding the borehole can be determined from such receiver measurements and knowledge of the voltage at source 82.

In FIG. 7, the apparatus is configured so as to provide measurement of variable azimuthal resistivity in the formation adjacent to the drillstring. A power source at 68a and suitably driven switching circuits at 67 and 71 drive current along paths 77 into and in the formations, through electrodes 65 and 73, located around the circumference of upper and lower sub-assemblies 64 and 72, mounted between upper and lower sections of the drillstring 63 and 63a, and connected to the power source by an insulated wireline 70. An insulated, intermediate section of the string appears at 69.

A downhole motor appears above the drill bit 75 at 76. The current flow at electrodes 65 and 73 may be focused by guard electrodes at 74 and 66. Switches 67 and 71 operate to azimuthally distribute the voltage application to upper and lower electrodes at different azimuth locations. Such switches are programmably driven, as at 67a and 71a. Multiple voltage-sensing electrodes 81, 82, 83, and 84 are mounted on the circumference of lower sub-assembly 72. Potential differences between various voltage sensors are selected by the upper control sub-assembly via wireline connection 70. In a manner similar to operation of apparatus described and shown in FIG. 5, azimuthal resistivity values adjacent to the borehole are interpreted and transmitted to the surface.

Referring to FIG. 8, the elements of the invention are shown in more detail, in association with a drillstring in a well. The string includes metallic drill pipe, with sections 104 extending from the earth surface downwardly in a borehole 120, to connect at 121 to the upper end of insulative collar 106. Metallic drillstring section 105 is connected at 122 to the lower end of collar 106, and extends downwardly toward a drill bit not shown. The non-conductive portion of collar 106 may consist of very high-strength composite material, such as KEVLAR, or glass fibers in resin.

String components 121 and 122 are metallic components of collar 106 having pin and box connection to the drill pipe section, and tapered or conical bonded connections to the non-conductive portion of collar 106 at 126 and 127. Drilling fluid typically flows downwardly in the string and through bore 128 in 106; and flows upwardly about the string to carry borehole cuttings to the surface.

A battery pack (source of voltage) 130 is typically located in hanging sub-assembly 135 above 106, one terminal of the source of voltage in electrical connection with centralizer (belly-type) springs 132 located between the battery pack housings 130 and the bore 133 of 104. An electrical connection is thereby established to the upper string section 104. Hanging sub-assembly 135 supports pack 130 in position, as shown, and may be of any suitable form. Note hang support location 135c.

Wireline 138 extends downwardly from the battery pack, through the insulating collar 106 to connect to pulser means 140a in the lower drillstring section. That pulser means is electrically connected to centralizer (belly-type) springs 141 contacting the bore 142 of lower string section 105. Accordingly, the drillstring sections 104 and 105 near the collar 106 act as effective upper and lower electrodes, one to pass current into the formation, and the other to receive current flow back from the formation.

A second battery pack and housing 140b supplies power to pulser means 140a and sensor means 140c. The latter means 140c produces signals which are encoded by pulser means 140a. A hang support at 140d carries 140b.

Details of the mechanical positioning of the switching and sensor modules is shown in FIG. 9. A modulator means housed in pressure barrel 320 controls flow of electrical current through wireline 6 to the drillstring 5 by means of an electrical connection from the modulator housing to a pressure barrel 320, and from that pressure barrel to the drillstring by electrically conductive drilling fluids or centralizer means 322. Signals from the sensor package, housed in pressure barrel 323, are carried by line or cable means 325 to a multiplexer means housed in barrel 320, and from there to modulator means also housed in barrel 320. Power is supplied from source housed in pressure barrel 324 to the sensors by means 328, to the multiplexer and to the modulator by means 327. The entire assembly is supported by hanging sub-assembly 135a carried by the string, and constrained from rotation by means 135b.

The transceiver/sensor package is shown in its functional relation to the drillstring in FIG. 10. An insulated wireline 6 is connected from one terminal of a source of voltage or current 24 to the conductive string section at the lower end of a resistive section of the drillstring shown schematically at 303. The other terminal of said source is connected to the conductive string section at the upper end of said resistive section. A means 309 for modulating or reversing polarity of the source 24 in response to the output of sensors 307a is provided. The multiple sensor outputs 1 through "n" are combined by a multiplexer 307b before input to the modulator 309.

The apparatus may also be configured in a manner such that the wellbore casing enhances the conductive path for transmitted currents to the surface. In this configuration, an insulating section is provided in the wellbore casing, as shown in FIG. 11. Insulating section 350 confines the flow of electrical currents from the section of drillstring 351 above the transmitting gap to the wellbore casing 352 above the insulating section 350, thereby increasing the current flow 353 between receiver electrodes 9 and 9a proximate the surface. Note connection of surface line 8a to the casing at 9b.

Other configurations of drillstring and wellbore casing gaps and wireline connections are possible, all with the purpose of improving signal strength at the receiver electrodes.

Multiple, non-conducting sub-assemblies may be connected in series, or parallel, or any combination thereof, by use of switching sub-assemblies, as shown in FIG. 12. A power source 401 is connected in either positive or negative polarity by switching means 402 to a pair of conductors 403 and 404 insulated from the drillstring and drilling fluids by tubular sheaths 405 and 406. These conductors may be comprised of specially designed insulated wireline components. In this form, the drillstring is comprised of multiple, non-conducting sub-assemblies 407 and 409, which are series separated by one or more electrically conducting drillstring components 408 and 410. Connector elements 411 and housing 412 are provided, whereby the conductors are connected to connector elements which connect 413 to electrically conducting drillstring elements 408. By appropriate selection of elements 411 to provide connection or non-connection of the conductors to the electrically conductive drillstring elements, the non-conducting sub-assemblies are connected in series, parallel or any combination thereof with the power source.

As in previously described forms of the invention, a modulator 414 is deployed in the bottom hole assembly 415 so as to modulate the flow of electric current in the aforementioned circuit for the purpose of transmission of signals derived from one or more sensors 416.

Referring to FIG. 13, elements of the apparatus are shown in more detail, in association with a drillstring in a well. The string includes drill pipe sections, with sections 104 extending from the earth surface in a borehole 120, to connect at 121 to conductive adapter 435 at the upper end of insulating portion 432 of a non-conductive collar.

The gap sub-assembly may be provided with a resistive element 431 providing a leakage path for wireline communication with the bottom hole assembly. The resistive element 431 is embedded in the insulative material 432 of the gap sub-assembly and electrically connected to upper 435 and lower 436 conductive fittings at 433 and 434, respectively. Communication from the surface to the sensor and modulator electronics is accomplished by a communications path employing wireline means 437 connected through upper battery pack 439, to insulated wireline 440, to downhole modulator and sensor electronics 442.

In another form of the invention, the insulated wireline components are replaced by a conductor 440 within an insulating tubular sheath 441, as shown in FIG. 12.

Pressure changes or flow of drilling fluid may be encoded for communication from the surface to downhole components of the invention. FIG. 14 shows the use of a pressure switch 701 for this purpose. Changes in pressure or flow rate of drilling fluid 702 internal to drillstring 703 is sensed by pressure switch means 701, which in turn provides input signals to control means 704. Control means 704 is used to control operation of downhole instrumentation, including modulator means 705, power source 706, and sensor means 707. Typically changes in the drilling fluid flow rate, controlled from the surface, can be used to conserve downhole power consumption by the means of the invention.

In another form of the invention, multiple receiver electrodes 501, 502, 503, 504, and 505 are deployed as shown in FIG. 15. Some of the electrodes may be effected by direct connections 501a and 505a, to the active drillstring or casing 501, or adjacent well casings 505. By a switching means 506 and comparator means 507, electrode signals are combined in a manner which provides the best signal reception from a downhole transmitter. The switching and comparator means may also be used to provide information on lateral changes in geologic formation, such as the change in resistivity from formation 508 to formation 509.

The invention improves methods of downhole target detection, location, and tracking while drilling as by means shown in FIG. 16. A time-varying current 521 is injected along the drillstring and into the formation surrounding the drillstring by transmitter means 522. Target casing 523 provides an electrically conductive path in the formation for currents 521. As a result, current is concentrated, 524, on target casing 523. Current flow 524 results in a time varying magnetic field 525, which is measured by magnetometer means 526. Time varying magnetic fields 525, measured by means 526 in the bottom hole assembly, bears a known relation to the position of target casing 523. Such measurements are transmitted to the surface for reception by receiver means 9 and calculation of target position by surface means 528.

The invention also incorporates several additional improvements over the prior art. These are:

1) A means for the generation of low voltage electrical pulses to carry the signal information and thereby reduce the danger of electrical breakdown and discharge in the wellbore. In the prior art of direct coupled systems, the impedance mismatch between the source and surrounding formation was sometimes overcome by generating extremely high voltage pulses by the charging of a downhole capacitor. By reducing the required voltage, the present novel configuration reduces the hazard of such wellbore discharges.

2) The generation of easily controlled and synthesized low voltage pulse waveforms also permits the application of recent advances in digital i.e., short duration waveform signal processing to the detection of low-level signals in the presence of natural and man-made noise.

3) The improved detection of synthesized waveforms permits Wavelet signal processing for the interpretation of low level signals. Wavelet analysis is a relatively new method of signal processing, which permits efficient "de-noising" of broad-band signals (see Daubechies, I, 1992, "Ten Lectures on Wavelets", Society for Industrial and Applied Mathematics). The received waveform of a doublet (positive-negative pulse pair) when transmitted through the drillstring-formation path is modified so as to resemble one of the Daubechnies family of wavelets. This permits the compact and therefore fast recognition of electric field signals in the presence of noise.

4) Detecting the arrival time of electric field pulses generated at the downhole gap sub-assembly permits interpretation of pulse waveforms in the time domain, thus allowing determination of distance to discontinuities in formation resistivity.

5) Improved detection by employing multiple voltage-sensing electrodes on the surface and using common mode rejection and noise cancellation techniques at the surface receiver allows selection of the best electrode combination. The choice of surface electrode combinations may change during the drilling operation. These changes may be due to changes in the noise sources, changes in the spatial location of the downhole transmitter, or changes in the intervening formations.

5a) Improved signal transmission to the surface by optimal selection of downhole transmitter locations and combinations and surface potential sensing electrodes, locations and combinations.

6) A means for changing the carrier frequency using the talk-down capability to obtain an optimum frequency for the current drilling depth is attainable. On occasion, it may be desirable to use a modulated signal carrier frequency rather than pulse transmission.

Theoretical studies indicate that an optimum transmission frequency exists for different combinations of geologic factors.

7) The invention contemplates a system, the components of which may be deployed in various ways, according to the requirements at the wellsite. For example, as an alternative to the configuration shown in FIG. 2b, as a highly resistive formation is penetrated during drilling, it may be useful to change the bottom hole assembly from an insulated gap configuration to a long wireline-direct drillstring connection configuration.

8) The invention contemplates provision of an apparatus for downhole electric-field telemetry comprising a source of pulsed or amplitude modulated voltage or current, one or several insulating drill collars, conventional drill collars or gap sub-assemblies, and a system of insulated wireline components used to provide electrical connections, insulated from drilling fluids, between the ends of the one or more aforementioned insulated drill collars in the drillstring.

Such apparatus may be used to optimize the downhole position or depth in a drillhole of a source of pulsed or amplitude modulated voltage or current, by selection of any single or combination of insulated drill collars or gap sub-assemblies in the drillstring.

In such apparatus, the frequency, waveshape or encoding mechanism of the transmission system is typically adaptively varied to obtain optimum transmission characteristics such as date rates for either or both telemetry and evaluation of formation resistivity and induced polarization characteristics.

9) The apparatus may include two or more surface electric potential electrodes connected to a central control unit to adaptively optimize electrode location during drilling operations for the purpose of rejecting common mode and local noise or evaluating geologic structure. One or more of such electrodes is or are either the active drillstring or nearby well casings.

In operation, the formation resistivity and induced polarization, both at the bit and/or surrounding the borehole, are measured with the same apparatus and concurrently with borehole telemetry transmissions.

10) The apparatus improves downhole reception of surface-generated electric fields by use of multiple surface transmitter electrodes connected in a configuration to optimize transmission to a downhole receiver.

Such apparatus measures the electric fields in a drillhole through use of insulating drill collars connected by wireline components. Direct connection to the drillstring using widely spaced electrodes and wireline components can be substituted for the aforementioned insulating drill collars or gap sub-assemblies. Also, direct connection to the casing of a well can be substituted for the aforementioned direct connection to the drillstring.

11) The herein described method for the measurement of azimuthal or average values of formation resistivity and/or induced polarization may include use of any of, or any combination of, apparatus or devices as referred to, together with well known geophysical techniques, for measurement of resistivity and induced polarization.

12) The herein described method for downhole telemetry in producing wells may include apparatus as referred to, together with downhole sensors, encoders, and transmission electronics.

More specifically, apparatus to measure azimuthal or average values of resistivity and induced polarization of the geologic formation surrounding a drillhole near the bit, typically comprises multiple current electrodes and voltage-sensing electrodes, placed on a mandrel or drill collar just above the bit, and below the motor or other drill collars, connected by wireline to a set of current electrodes above and separated from the motor housing or drill collars by an insulating drill collar or gap sub-assembly. A means for determining toolface direction, such as a pair of cross-axis accelerometers or magnetometers, or other physical measurements, may be used to resolve the azimuthal direction of resistivity or induced polarization measurements.

13) An apparatus and method for detecting and locating a nearby electrically conductive target, such as a nearby well casing, may include apparatus as described to inject electric current into the formation surrounding the wellbore and measurement, and analysis of the anomalous vector magnetic fields produced by the concentration of the aforementioned electric current on the target.

The apparatus and methods may be used to detect and/or locate changes in formation resistivity, due to the presence of an electrically conductive object, such as a nearby well casing.

14) The apparatus and methods may be used to locate the position and orientation of a nearby electrically conductive object, such as a well casing.

See the casing 300 in FIGS. 1, 4 and 7, the presence of which affects the return current flow in the formation, to be detected as by voltage variation detector at 8 at the surface (see FIG. 2). Also, wavelet signal processing may be used to detect anomalous magnetic or electric-fields. The frequency of a periodic source voltage at the insulated gap may be varied to obtain maximum electric or magnetic field response from the conductive target.

15) The electrical and induced potential structure of the formation surrounding the borehole and of the formation between the surface and downhole locations can be determined with the apparatus of the invention by measuring the potential between various of the multiple surface electrodes of the apparatus in response to a known current or voltage waveform transmitted by the downhole source apparatus, either expressly for the purpose of determining the geoelectrical structure or in association with telemetry transmissions.

Conversely, the apparatus can be used to evaluate the electrical and induced potential structure of the formation surrounding the borehole and of the formation between the surface and downhole locations by comparison of voltage received at various downhole locations in response to known voltage or current waveforms generated between various configurations of surface electrodes.

16) An apparatus and method for downhole magnetometric formation evaluation. By addition of appropriate magnetic field sensors to the bottom hole assembly, time varying magnetic fields produced by the concentrated flow of electric current in electrically conductive regions of the formation can be detected. Using the prior art of surface geophysics, the electrical structure of the formation surrounding the borehole is determined.

Various uses of the invention are listed as follows:

1. Use of the bottom hole assembly below a non-conducting drill collar, as an electrode for transmission of electric currents in an electric-field borehole telemetry system, the non-conducting drill collar providing an insulating gap for transmission of electric currents to the surface.
2. Use of centralizers as electrical contactors between components of an electric-field telemetry system mounted in a drillstring and the drillstring itself, the bow springs of the centralizers making contact with the interior wall of the drillstring.
3. Use of drillstring stabilizers as electrical contactors between drillstring components and the borehole wall in an electric-field telemetry system, the stabilizer blades making electrical contact with the borehole wall.
4. Use of drill collars comprised of electrically insulating material to provide electrical gaps in the drillstring, said gaps being sufficiently longer than in the prior art, for the purpose of reducing downhole power requirements in an electric-field downhole telemetry system.

5. Use of one or more electrically insulating drillstring collars in an electrically conductive drillstring, together with one or more electrically insulated sections of wellbore casing, the ends of the insulating drillstring collars electrically connected by insulated wireline components and the insulated sections of wellbore casing located, so as to maximize the flow of electric current to the surface in an electric-field downhole telemetry system.

6. Use of one or more electrically insulating drillstring collars, the ends of the insulating collars connected by electrically insulated wireline components in a manner such that the impedance of the entire assembly, measured from the surface of the earth, is varied so as to comprise a borehole telemetry system.

7. Use of a downhole pressure switch in an electric-field telemetry system to detect acoustic pulses, transmitted from the surface, to control operation of the electric-field telemetry system.

We claim:

1. An apparatus for borehole electric field telemetry comprising a source of modulated voltage or current, at least one axially extending insulative collar connected between pipe sections in a pipe string, and a system of insulated wireline components providing electrical connections, insulated from drilling fluids, between the ends of the one or more aforementioned insulative collars in the pipe string, to transmit said voltage or current, said source of modulated voltage or current comprising electrical pulse-producing means for producing short duration pulse wave forms selected to obtain optimum transmission characteristics in the underground formation, said electrical connections being to the drill string, and there being upper and lower instrument housings associated with said electrical connections which are upper and lower connections, said housings supported within the pipe string, the upper housing located above at least one of said insulative collars, and the lower housing projecting below said insulative collar, said pulse-producing means located within at least one of said housings.

2. The apparatus of claim 1 including multiple surface electric potential electrodes selectively connected at a central control unit to effectively achieve rejection of common mode and local noise, there being means to effectively shift positioning of multiple of said surface electrodes in relation to the underground formation so as to enhance identification of underground formation characteristics, one or more of said surface electrodes comprising at least one of the following:
   i) the pipe string in the form of an active drillstring
   ii) nearby well casing
   iii) the pipe string in the form of an active well casing.

3. The apparatus of above claim 1 wherein said wireline components comprise at least one of the following:
   i) conductor within a low conductivity tubular sheath
   ii) a tube containing a wire.

4. The apparatus of claim 1 wherein measuring means is provided whereby formation resistivity and/or induced polarization both at a drill bit carried by the pipe string and/or surrounding the borehole are measured concurrently with borehole telemetry transmissions, including
   coding of signal information derived from at least one electric field sensor carried by the string.

5. The apparatus of claim 1 wherein means is provided in association with one of said upper and lower housings whereby information derived from one or more sensors carried by the pipe string in spaced relation to said connectors is encoded and transmitted to the surface.

6. The apparatus of above claim 1 wherein the pipe string includes multiple conductive sections which together with said insulative collar provide effective enhancement of electrical resistance between said electrical connections.

7. In the method of electric field telemetry from a pipe string in a well, the well located in an underground formation, the steps that include
   a) providing electrical connections positioned in selectively coupled relation to the pipe string,
   b) and supplying an electrical signal for transmission between said connections,
   c) and detecting resulting signal transmission through the formation, and lengthwise of and along the pipe string,
   d) said supplying including providing electrical pulser means, supporting said pulser means within said pipe string at a subsurface location in the formation, and operating said pulser means to produce relatively short duration pulse wave forms selected to obtain optimum transmission characteristics in the underground formation,
   e) and providing upper and lower instrument housings associated with sand electrical connections which are upper and lower connections, said housings supported within the pipe string, the upper housing located above an elongated insulative section provided in the pipe string, and the lower housing projecting below said insulative section of the pipe string,
   f) and locating said pulser means within at least one of said housings.

8. The method of above claim 7 wherein said electrical signal is supplied as one of the following:
   i) pulsed voltage
   ii) pulsed current
   iii) amplitude modulated voltage
   iv) amplitude modulated current
   v) frequency modulation of one of;
      $x_1$) voltage
      $x_2$) current
   vi) phase shifting of one of
      $x_1$) voltage
      $x_2$) current
   vi) polarity reversal signal.

9. The method of above claim 7 wherein said insulative section is provided as one of the following:
   i) on a drillstring in the well
   ii) on well casing
   iii) by the formation about the electrodes
   iv) by an effective resistance of the drillstring between said electrodes.

10. The method of claim 7 including providing multiple upper said connections and multiple lower said connections, and positioning said upper and lower connections azimuthally about an axis extending lengthwise of the well.

11. The method of claim 7 including providing said connections in said pipe string that is a drillstring and that includes a drill bit, and a drill bit driving motor, the connections located in spaced relation to said motor.

12. The method of claim 7 including providing said connections on upper and lower extents of said pipe string, the upper connection provided at the upper housing above said insulative section and the lower connection provided at the lower housing below said insulative section, and providing an electrical power source in one of said housings and transducer means in another of said housings to modulate said electrical signal.

13. The method of claim 12 including selecting said pulser means to thereby provide an approximate electrical impedance match between:

i) circuitry defined by said connections, said upper and lower extents of the drillstring, and said insulative sections of the pipe string, ii) and the underground formation surrounding said circuitry.

14. The method of claim 7 wherein a target conductive object is located in the formation, and said detecting is carried out to detect the relative position of the pipe string which is a drillstring to said target.

15. The method of claim 14 wherein said target is a well casing, in the underground formation and spaced by the underground formation from said drillstring.

16. The method of claim 7 wherein centralizer means is provided in space between each of said upper and lower housings and the bore of the pipe string whereby well fluid can flow in the pipe string past said housings and centralizer means, the centralizer means providing said electrical connections.

17. The method of claim 16 wherein there is a drill bit at the lower end of the pipe string which is a drill string, said connections located at substantial distances above the drill bit, and including operating said drill bit, said step c) detection being effected during operation of the drill bit to drill into the downhole formation.

18. The method of claim 17 including providing an electrical power source in the upper housing at a substantial distance above the drill bit and said power source being in electrical communication with said pulser, and including providing said pulser to include a switch at a substantial distance above the drill bit, and in electrical communication with said electrical power source, for supplying said signal to said pulser.

19. The method of claim 16 including also locating electrical battery means in the upper housing in electrical communication with said pulser means, for supplying electrical power to said pulser means, and at a substantial distance above the drill bit.

20. The method of claim 16 including operating said pulser means for producing relatively short duration pulse wave forms selected to obtain optimum transmission characteristics in the underground formation.

21. The method of claim 20 including operating said pulser means for producing pulse polarity reversal.

22. The method of claim 7 wherein there is well bore casing in the well, the pipe string being a drillstring located in the well with the upper portion of the drillstring surrounded by said casing, said bore casing comprised of electrically insulating and electrically conducting sections, and including positioning said sections between said housings so as to produce enhancement of said detecting of signal transmission.

23. The method of claim 7 including providing wireline structure having multiple parallel conductive paths between different upper and lower components in said upper and lower housings.

* * * * *